(12) United States Patent
Johnson et al.

(10) Patent No.: US 8,788,606 B2
(45) Date of Patent: Jul. 22, 2014

(54) MULTIMEDIA ALERTING

(75) Inventors: James T. Johnson, Norman, OK (US); Mark Taylor, Marietta, GA (US); William Todd Daniell, Kennesaw, GA (US); Michael D. Eilts, Norman, OK (US); Sheetal Wrzesien, Smyrna, GA (US); Charles Barrere, Norman, OK (US)

(73) Assignee: Weather Decision Technologies, Inc., Norman, OK (US)

(*) Notice: Subject to any disclaimer, the term of this patent is extended or adjusted under 35 U.S.C. 154(b) by 378 days.

(21) Appl. No.: 13/082,236

(22) Filed: Apr. 7, 2011

(65) Prior Publication Data

US 2011/0270940 A1 Nov. 3, 2011

Related U.S. Application Data

(60) Provisional application No. 61/322,640, filed on Apr. 9, 2010.

(51) Int. Cl.
  *G06F 15/16* (2006.01)
  *G06F 15/173* (2006.01)
  *H04L 12/18* (2006.01)
  *H04L 12/58* (2006.01)
  *H04L 29/08* (2006.01)

(52) U.S. Cl.
  CPC ........ *H04L 12/1895* (2013.01); *H04L 12/1845* (2013.01); *H04L 51/14* (2013.01); *H04L 67/02* (2013.01); *H04L 67/12* (2013.01); *H04L 67/20* (2013.01); *H04L 67/26* (2013.01); *H04L 67/322* (2013.01)
  USPC .......................................... 709/207; 709/224

(58) Field of Classification Search
  USPC ......................................................... 709/207
  See application file for complete search history.

(56) References Cited

U.S. PATENT DOCUMENTS

| | | | |
|---|---|---|---|
| 4,582,491 A * | 4/1986 | Monteith | ...................... 434/218 |
| 5,717,589 A | 2/1998 | Thompson et al. | |
| 5,910,763 A | 6/1999 | Flanagan | |
| 6,018,699 A | 1/2000 | Baron, Sr. et al. | |
| 6,125,328 A | 9/2000 | Baron, Sr. et al. | |
| 6,275,774 B1 | 8/2001 | Baron, Sr. et al. | |
| 6,297,766 B1 | 10/2001 | Koeller | |
| 6,339,747 B1 | 1/2002 | Daly et al. | |
| 6,493,633 B2 | 12/2002 | Baron, Sr. et al. | |
| 6,498,987 B1 | 12/2002 | Kelly et al. | |

(Continued)

*Primary Examiner* — Richard G Keehn

(57) ABSTRACT

A method, system, apparatus, and device provides alert information to a user of a device. In response to an alert notification of an alert, one or more alert geographical tiles of interest that are affected by the alert of a plurality of geographical tiles are determined; one or more location-enabled devices each having a location that falls within an alert geographical tile of the one or more alert geographical tiles are determined; a portion of the alert is retrieved from an alert database and processed to generate a media version of the alert; an alert text notification of the alert having the text portion of the alert, an alert identifier of the alert, a reference identifier for the media version of the alert, the one or more alert geographical tiles, and the one or more one or more device identifiers for each of the one or more devices is constructed; the one or more device identifiers for each of the one or more devices, the alert text notification and the alert identifier of the alert is retrieved and the alert text notification is transmitted to the one or more devices corresponding to the retrieved one or more device identifiers.

42 Claims, 25 Drawing Sheets

(56) References Cited

U.S. PATENT DOCUMENTS

| | | | |
|---|---|---|---|
| 6,505,123 B1 | 1/2003 | Root et al. | |
| 6,603,405 B2 | 8/2003 | Smith | |
| 6,608,559 B1 | 8/2003 | Lemelson et al. | |
| 6,654,689 B1 | 11/2003 | Kelly et al. | |
| 6,753,784 B1 | 6/2004 | Sznaider et al. | |
| 6,754,585 B2 | 6/2004 | Root et al. | |
| 6,816,878 B1 | 11/2004 | Zimmers et al. | |
| 6,823,263 B1 | 11/2004 | Kelly et al. | |
| 6,826,481 B2 | 11/2004 | Root et al. | |
| 6,829,536 B2 | 12/2004 | Moore | |
| 6,836,730 B2 | 12/2004 | Root et al. | |
| 6,845,324 B2 | 1/2005 | Smith | |
| 6,920,204 B1 | 7/2005 | Tuttle | |
| 6,941,126 B1 | 9/2005 | Jordan, Jr. | |
| 6,980,909 B2 | 12/2005 | Root et al. | |
| 6,985,813 B2 | 1/2006 | Root et al. | |
| 6,988,037 B2 | 1/2006 | Root et al. | |
| 6,995,686 B2 | 2/2006 | Gosdin et al. | |
| 7,024,310 B2 | 4/2006 | Root et al. | |
| 7,053,780 B1 | 5/2006 | Straub et al. | |
| 7,058,510 B2 | 6/2006 | Kelly et al. | |
| 7,084,775 B1 | 8/2006 | Smith | |
| 7,089,116 B2 | 8/2006 | Smith | |
| 7,139,664 B2 | 11/2006 | Kelly et al. | |
| 7,181,345 B2 | 2/2007 | Rosenfeld et al. | |
| 7,191,065 B2 | 3/2007 | Root et al. | |
| 7,194,249 B2 | 3/2007 | Phillips et al. | |
| 7,248,159 B2 | 7/2007 | Smith | |
| 7,268,703 B1* | 9/2007 | Kabel et al. | 340/984 |
| 7,289,908 B2 | 10/2007 | Root et al. | |
| 7,315,782 B2 | 1/2008 | Root et al. | |
| 7,383,130 B1 | 6/2008 | Koosam | |
| 7,411,493 B2 | 8/2008 | Smith | |
| 7,421,344 B1 | 9/2008 | Marsh et al. | |
| 7,460,021 B1 | 12/2008 | Bacon | |
| 7,486,201 B2 | 2/2009 | Kelly et al. | |
| 7,602,285 B2 | 10/2009 | Sznaider et al. | |
| 7,609,819 B1 | 10/2009 | Tuttle | |
| 7,725,256 B2 | 5/2010 | Marsh | |
| 7,788,029 B2* | 8/2010 | Nagase et al. | 701/422 |
| 7,869,953 B1 | 1/2011 | Kelly et al. | |
| 8,024,112 B2* | 9/2011 | Krumm et al. | 701/423 |
| 8,320,873 B2* | 11/2012 | Sennett et al. | 455/404.1 |
| 2002/0004705 A1* | 1/2002 | Baron et al. | 702/3 |
| 2002/0016677 A1* | 2/2002 | Baron et al. | 702/3 |
| 2002/0039405 A1 | 4/2002 | Newland et al. | |
| 2002/0067289 A1 | 6/2002 | Smith | |
| 2003/0093530 A1* | 5/2003 | Syed | 709/226 |
| 2003/0120426 A1* | 6/2003 | Baron et al. | 702/3 |
| 2004/0172655 A1 | 9/2004 | Nishiyama et al. | |
| 2004/0181340 A1 | 9/2004 | Smith | |
| 2005/0086004 A1 | 4/2005 | Smith | |
| 2005/0197775 A1 | 9/2005 | Smith | |
| 2005/0240378 A1 | 10/2005 | Smith et al. | |
| 2006/0015254 A1 | 1/2006 | Smith | |
| 2006/0025106 A1 | 2/2006 | Byers et al. | |
| 2006/0265489 A1 | 11/2006 | Moore | |
| 2007/0008109 A1* | 1/2007 | Wang | 340/539.11 |
| 2007/0047520 A1 | 3/2007 | Byers et al. | |
| 2007/0049260 A1* | 3/2007 | Yuhara et al. | 455/414.3 |
| 2007/0073477 A1* | 3/2007 | Krumm et al. | 701/209 |
| 2007/0100542 A1* | 5/2007 | Courtney et al. | 701/208 |
| 2007/0150185 A1* | 6/2007 | Nagase et al. | 701/209 |
| 2007/0159355 A1 | 7/2007 | Kelly et al. | |
| 2007/0252688 A1* | 11/2007 | Eisold et al. | 340/506 |
| 2007/0275742 A1* | 11/2007 | Zhang | 455/466 |
| 2007/0296575 A1* | 12/2007 | Eisold et al. | 340/539.16 |
| 2008/0018453 A1 | 1/2008 | Adler | |
| 2008/0109317 A1* | 5/2008 | Singh | 705/14 |
| 2008/0225848 A1* | 9/2008 | Pilon et al. | 370/390 |
| 2009/0124232 A1 | 5/2009 | D'Arcy et al. | |
| 2009/0160873 A1 | 6/2009 | Kew et al. | |
| 2009/0273713 A1* | 11/2009 | Goldman et al. | 348/563 |
| 2010/0082307 A1* | 4/2010 | Dorum et al. | 703/2 |
| 2010/0145947 A1 | 6/2010 | Kolman et al. | |
| 2010/0162300 A1* | 6/2010 | Velazquez et al. | 725/33 |
| 2010/0211971 A1* | 8/2010 | Howarter et al. | 725/33 |
| 2010/0211972 A1* | 8/2010 | Howarter et al. | 725/33 |
| 2010/0306154 A1* | 12/2010 | Poray et al. | 706/47 |
| 2010/0321178 A1* | 12/2010 | Deeds | 340/539.1 |
| 2011/0159837 A1* | 6/2011 | Daly et al. | 455/404.1 |

\* cited by examiner

MULTIMEDIA ALERTING

PRIORITY CLAIM

This application claims priority to U.S. Provisional Patent Application No. 61/322,640 filed Apr. 9, 2010, which is hereby incorporated herein by reference in its entirety.

CROSS REFERENCE TO RELATED APPLICATIONS

This application is related to the following co-pending U.S. patent applications: application Ser. No. 13/082,250, filed on even date herewith, which is incorporated herein in their entirety.

BACKGROUND

NOAA Weather Radio is a service of the National Oceanic and Atmospheric Administration (NOAA) of the U.S. Department of Commerce. As the "Voice of the National Weather Service", it provides continuous broadcasts of the latest weather information from local National Weather Service offices. Weather messages are repeated every 4 to 6 minutes, and are routinely updated every 1 to 3 hours or more frequently in rapidly changing local weather, or if a nearby hazardous environmental condition exists. The service operates 24 hours daily. The regular broadcasts are specifically tailored to weather information needs of the people within the service area of the transmitter. For example, in addition to general weather information, stations in coastal areas provide information of interest to mariners. Other specialized information, such as current conditions and forecasts, may be broadcast.

During severe weather, National Weather Service forecasters can interrupt the routine weather broadcasts and insert special warning messages concerning imminent threats to life and property. The forecaster can also add special signals to warnings that trigger "alerting" features of specially equipped receivers. This is known as the tone alert feature, and acts much like a smoke detector in that it will alarm when necessary to warn of an impending hazard. Currently, all receivers equipped with the tone alert feature within the listening area will alarm when a warning is issued. However, in the future, only receivers located in the warned area (normally a specific county or counties) will alarm. This feature is referred to as Specific Area Message Encoding (SAME), and will be the primary activator for the new Emergency Alert System currently being implemented by the Federal Communication Commission.

Under a January 1975 White House policy statement, NOAA Weather Radio was designated the sole government-operated radio system to provide direct warnings into private homes for both natural disasters and nuclear attack. This concept is being expanded to include warnings for all hazardous conditions that pose a threat to life and safety, both at a local and national level. NOAA Weather Radio currently broadcasts from over 400 FM transmitters on seven frequencies in the VHF band, ranging from 162.400 to 162.550 megahertz (MHz) in fifty states, Puerto Rico, the Virgin Islands, Guam, and Saipan. These frequencies are outside the normal AM or FM broadcast bands.

Special radios that receive only NOAA Weather Radio, both with and without the tone alert feature, are available from several manufacturers. The radios can usually be found at most department and electronics stores. In addition, other manufacturers are including NOAA Weather Radio as a special feature on an increasing number of receivers. NOAA Weather Radio capability is currently available on some automobile, aircraft, marine, citizens band, and standard AM/FM radios, as well as communications receivers, transceivers, scanners, and cable TV.

By nature and by design, NOAA Weather Radio coverage is typically limited to an area within 40 miles, using 500 watt transmitters, of the transmitter. The quality of what is heard is dictated by the distance from the transmitter, local terrain, and the quality and location of the receiver. In general, those on flat terrain or at sea, using a high quality receiver, can expect reliable reception far beyond 40 miles. Those living in cities surrounded by large buildings, and those in mountain valleys, with standard receivers may experience little or no reception at considerably less than 40 miles. If possible, a receiver should be tested in the location where it will be used prior to purchase.

NOAA Weather Radio is directly available to approximately 70 to 80 percent of the U.S. population. The National Weather Service is currently engaged in a program to increase coverage to 95 percent of the population.

Using an existing NOAA issued weather radio; the user of this service is required to tune the weather radio to a given frequency based on their location before the radio will work. Once working, the weather radio will notify the users covering an area of approximately 40 miles radius from the transmitter, see the NOAA Weather Radio coverage maps at http://www.weather.gov/nwr/Maps/. Currently, the NOAA Weather Radio Network includes 1000 transmitters, covering all 50 states, adjacent coastal waters, Puerto Rico, the U.S. Virgin Islands, and the U.S. Pacific Territories.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
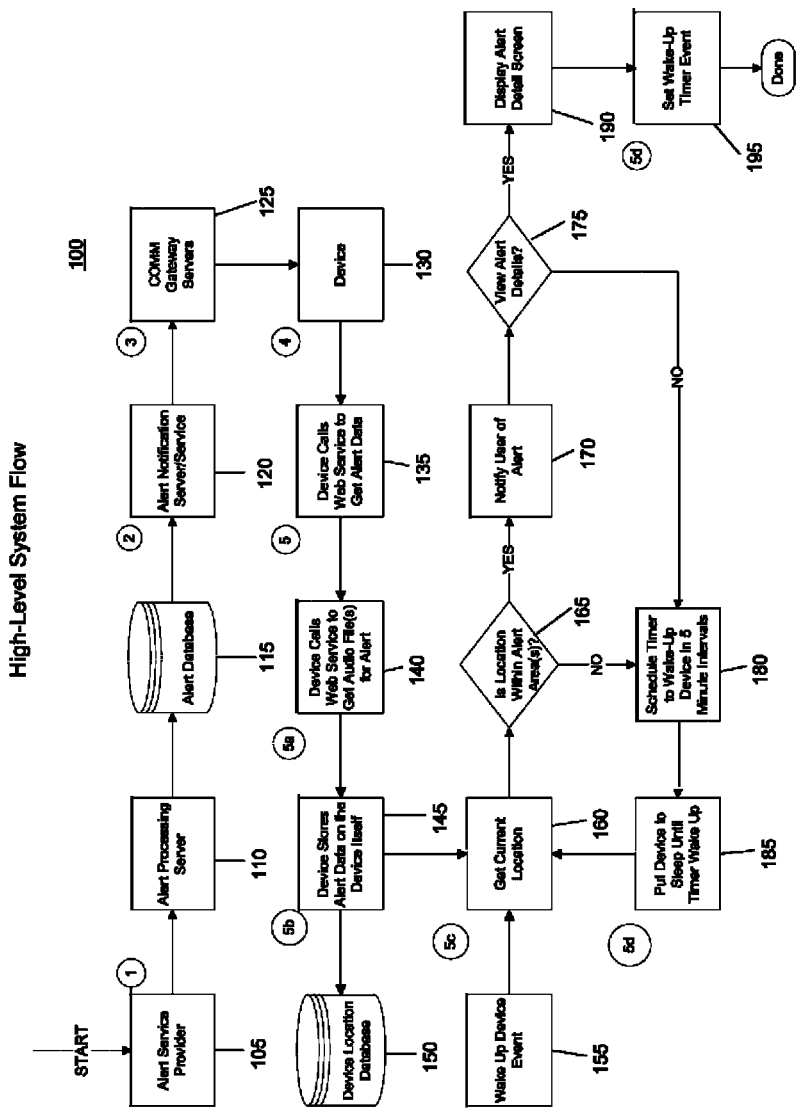
FIG. 1 is a flowchart of a high-level system flow, in accordance with various representative embodiments.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Introduction

Due to the large percentage of mobile device users, especially with the significant increase in the use of Smart phones, mobile devices provide an excellent vehicle for delivering severe warning messages of impending severe weather or other hazards to the public. In addition to this, most new mobile phones possess the capability to determine their device location within less than 1 km accuracy. This is enough resolution to make use of the United States National Oceanic and Atmospheric Administration (NOAA) severe warning system and other weather and hazard warning systems to determine if the location of the device is in such a hazard. In addition to mapping severe weather alerts, this System can map the DMA (Direct Marketing Area) of the device to local television and/or radio broadcasters that might have even more information for the user about the severity of the conditions and how the conditions might affect them.

Given those facts, the Multimedia Alerting method, system, apparatus, and device as described in embodiments herein provide the ability to convert mobile devices into a video, audio and/or textual severe weather early warning devices and to allow local television and/or radio broadcasts to be directed to a user of a mobile device in times of impending danger.

Multimedia alerting is designed to support high-end mobile phones, smart phones, and other portable computing devices that can obtain its location, has access to an Internet data source, and has the capability to at least render digital audio and possibly also video alert information to the user of the device.

It is noted that while the use of portable, mobile devices, such as cellular telephones, mobile phones, smart phones, and the like are discussed, the embodiments described herein are not limited to usage with mobile devices. Any location-enabled device for which location can be determined, including stationary devices and/or vehicles and assets or objects of interest, are compatible with the embodiments described herein. These devices will have at least an audio capability of delivering and providing messages via a user interface having audio capabilities regarding weather conditions and non-weather conditions relevant to one or more locations of interest which may or may not be the location of the device itself, as will be described. These devices may also have a video/visual capability of delivering and providing messages via a user interface having audio and/or visual capabilities regarding weather conditions and non-weather conditions relevant to one or more locations of interest.

Therefore, in accordance with various embodiments disclosed herein, a method of providing alert information to a user of a device comprises: in response to an alert notification of an alert, determining one or more alert geographical tiles of interest that are affected by the alert of a plurality of geographical tiles, wherein each geographical tile of the plurality of geographical tiles represents a unique geographic projection of a rendered geographical area of defined size; determining one or more location-enabled devices each having a location that falls within an alert geographical tile of the one or more alert geographical tiles; retrieving a portion of the alert from an alert database and processing the portion of the alert to generate a media version of the alert; constructing an alert text notification of the alert having the text portion of the alert, an alert identifier of the alert, a reference identifier for the media version of the alert, the one or more alert geographical tiles, and the one or more one or more device identifiers for each of the one or more devices; and retrieving the one or more device identifiers for each of the one or more devices, the alert text notification and the alert identifier of the alert and transmitting the alert text notification to the one or more devices corresponding to the retrieved one or more device identifiers. A device of the one or more devices may receive and process the alert text notification and request to receive alert data of the alert. Received alert data of the alert may be presented to a user of the device through a user interface of the device.

Moreover, in accordance with various embodiments disclosed herein, a method of providing alert information to a user of a device comprises: an alert service provider transmitting an alert notification of an alert to an alert processing server; storing the alert notification in an alert database coupled to the alert processing server; an alert notification server retrieving the alert notification from the alert database and determining one or more alert geographical tiles of interest that are affected by the alert of a plurality of geographical tiles, wherein each geographical tile of the plurality of geographical tiles represents a unique geographic projection of a rendered geographical area of defined size; the alert notification server determining one or more location-enabled devices each having a location that falls within an alert geographical tile of the one or more alert geographical tiles; retrieving a text portion of the alert from the alert database and processing the text portion of the alert to generate an audio version of the alert; constructing an alert text notification of the alert having the text portion of the alert, an alert identifier of the alert, a reference identifier for the audio version of the alert, the one or more alert geographical tiles and the one or more one or more device identifiers for each of the one or more devices and storing the alert text notification into an alert notification queue; and a gateway server retrieving the one or more device identifiers for each of the one or more devices, the alert text notification and the alert identifier of the alert from the alert notification queue and transmitting the alert text notification to the one or more devices corresponding to the retrieved one or more device identifiers. A device of the one or more devices may receive and process the alert text notification and request to receive alert data of the alert. Received alert data of the alert may be presented to a user of the device through a user interface of the device.

Alert Types

The types of alert notifications that are supported by the various embodiments described herein include, but are not limited to: Weather Alerts, Lightning Alerts, Lightning Prediction Alerts, Traffic Alerts, and Emergency Alert Service (EAS) Service Network just to name a few possibilities.

Weather Alerts

A Weather Alert Service Provider may receive weather alerts and notifications from The National Weather Service of the United States or other sources, such as a Lightning detection system, weather forecast system, disaster/emergency alert services or other sources. These alerts are delivered in encoded text from the Alert Service Provider or System. The encoded text includes information relating to the severity of the alert, the type of phenomena or event that the alert represents, text describing the alert, the watch/warning boxes of the alert, a beginning time (estimated time of arrival (ETA)), an ending time (estimated time of departure (ETD)), and the current area effected by the phenomena.

Audio Alerts

Audio alerts are designed to mimic the voice audio supplied by a National Weather Service Weather Radio when a device user needs to be notified of severe weather, traffic, current weather conditions, weather forecasts, special public notices, or emergency conditions.

Audio Alert Types

There are at least two (2) types of audio available for alerts. One is statically generated audio that is 'baked into' the mobile applications and the other is a Text-to-Speech converted MP3 audio file that reads the header of the alert and/or reads the full alert text to the user. Audio Alerts do not necessarily need to be limited to weather alerts. They could include traffic alerts, public alert notifications, disaster warnings, and many more public notifications.

Generation of Audio Alerts

The audio alerts are generated by a Text-to-Speech engine, such as a third-party Text-to-Speech engine and provided to a user of a device by an alert software program or software application, also referred to as an Alert Application, a Back-end Application, or simply an "App", running on the Device. A Text-to-Speech engine supplies the Text-to-Speech conversion service through an Application Programming Interface (API) with which an application running on the Device may interface. This interface will allow the Alert Message or Service Provider to modify voice, speed, and inflection of the voice to be rendered by the application with supplied text. Each voice is also language dependant.

Also, please note when converting from Text-to-Speech the text must be first processed to replace any abbreviated text with full word versions of the abbreviation. For instance, "Feb" should be converted to February; "CDT" should be converted to "Central Daylight Time", as examples. These abbreviations that are commonly contained in alert text and include, but are not limited to: time zones, countries, hours, minutes, and days of the week, months, and states. Other phonetic modification may need to be made depending on the quality of the voice. Thus, a word prone to mispronunciation can be modified to match phonetically to the intended speech. For example, the spelling of the word "wind" may be modified to match phonetically to the intended speech, so that "wind" is converted to "wend".

Caching Audio Alerts

The Audio Alerts cache lifespan should match the life expectancy of the alert as defined in the data supplied by the alert source. A background task should be set to purge the audio files cached at configurable time that balances between server load and space available. The initial recommendation is to set the background task to run every hour, for example.

EAS/FEMA/Civil Defense/Homeland Security Alerts

The EAS alerts are delivered to the Weather Alert Service Provider as aggregated information by the National Weather Service contained within their alert bulletins. This information is parsed in the same manner as the Weather Alerts received from the National Weather Service. A Weather Alert Service Provider may combine data from multiple sources, such as the United States Geological Survey for Earthquake and Volcanic alerts, the United States Department of Justice for child abduction alerts, and the United States Department of Homeland Security for public security alerts.

In addition to this, the alerting system of a Weather Alert Service Provider may include alerts on a global basis.

Traffic Alerts

A user traveling along a highway could also be notified by both audible and/or visual alerts to changes in traffic conditions along a route, such as road work ahead, traffic slowing ahead, and other tests. This would also be defined by using tile and magnetic heading of the device.

The Alert Geographic Tile System

This alert system is based on identifying alert-affected areas in "Tiles" where each tile is defined as a geographic area identified by a "Tile Code".

Overview of Tiles

The Multimedia Alerting System is designed to provide an enhanced alerting feature set and expand the scope of alerts beyond traditional text-based severe weather text alerting products. One of the primary features of this alerting system is to reduce the number of "false alarms" received by the end-user. In order to accomplish this, the geographic grouping that matches alerts with the recipients of an alert is not based on traditional city, state, or county boundaries, in which actual latitude/Longitude polygons are provided for the affected area for a given alert. Due to the high volume of traffic that this alert system will process, this system cannot handle the computational complexity of attempting to determine if a recipients' location falls within a polygon using traditional means.

Based on these requirements, a tile coding system was developed to allow a backend alert software application to use a simple database query to determine what recipients should receive alerts based on a static (non-changing location, such as, a hospital or school) or dynamic (changeable location, such as, a tracked mobile device) location of interest. A recipient who should receive an alert may be a user of a device having location represented by a tile code of interest or the recipient may be a person interested in a tile code of interest even if their physical device is not itself located in the tile code of interest. These tile codes are used between the server and client device to represent a unique geographic projection of a rendered geographical area of defined size. The unique geographic projection may be a Mercator or other geographical projection rendered box or Tile, approximately 2 sq km in size, for example.

To accomplish this, a tile coding system was developed to allow communications between the server and client device, while maintaining an approximate 2 km (approximately 1.2 mile) accuracy, which we finally chose a representation of a Mercator box or Tile based on 1 arc minute of latitude and longitude within a text string. This allows the entire planet to be divided into an even number of sections or Tiles that can be quickly searched by a database while maintaining a reasonable resolution to be useful for weather alerting.

Tile Code Algorithms

In order to understand the concept of the tile code and its resolution one must first understand the length of a degree and arc minute on the planet. An arc minute, upon which the tile code is based, represents a square box or Tile on a Mercator projection of the curved planet. In reality, a one (1) arc minute by one (1) arc minute box is not a square but a four sided polygon in which all of the sides are slightly curved. But for the purposes of this document, the arc minute or Tile will be represented in its Mercator square form.

Degree and "Arc Minute" Length

The length of an arc degree of north-south latitude difference, $\Delta \phi$, is about 60 nautical miles, 111 kilometers or 69 statute miles at any latitude; more exactly, a degree of latitude at the pole covers about 1 percent more distance than a degree at the equator. The length of an arc degree of east-west longitude difference, roughly $\cos(\phi) \Delta\lambda$, is about the same at the Equator as the north-south, reducing to zero at the poles.

In the case of a spheroid, a meridian and its anti-meridian form an ellipse, from which an expression for the length of an arc degree of latitude is:

$$\left(\frac{\pi}{180}\right) M(\varphi)$$

This radius of arc (or "arc radius") is in the plane of a meridian, and is known as the meridional radius of curvature, M. Similarly, an expression for the length of an arc degree of longitude is:

$$\left(\frac{\pi}{180}\right) \cos(\varphi) N(\varphi)$$

The arc radius contained here is in the plane of the prime vertical, the east-west plane perpendicular (or "normal") to both the plane of the meridian and the plane tangent to the surface of the ellipsoid, and is known as the normal radius of curvature, N.

Along the Equator, east to west, N equals the equatorial radius. The radius of curvature at a right angle to the Equator, north to south, M, is 43 km shorter, hence the length of an arc degree of latitude at the Equator is about 0.7 km less than the length of an arc degree of longitude at the Equator. N and M are equal at the poles, where they are about 64 km greater than the north-south equatorial radius of curvature because the polar "radius" is 21 km less than the equatorial radius. The shorter polar "radii" indicate that the northern and southern hemispheres are flatter, making their radii of curvature longer. This flattening also 'pinches' the north-south equatorial radius of curvature, making it 43 km less than the equatorial radius. Both radii of curvature are perpendicular to the plane tangent to the surface of the ellipsoid at all latitudes, directed toward a point on the polar axis in the opposite hemisphere (except at the Equator where both point toward Earth's center). The east-west radius of curvature reaches the axis, whereas the north-south radius of curvature is shorter at all latitudes except the poles.

The WGS84 ellipsoid, used by all GPS devices, uses an equatorial radius of 6378137.0m and an inverse flattening, (1/f), of 298.257223563, hence its polar radius is 6356752.3142m and its first eccentricity squared is 0.00669437999014. The more recent but little used IERS 2003 ellipsoid provides equatorial and polar radii of 6378136.6 and 6356751.9m, respectively, and an inverse flattening of 298.25642. Lengths of degrees on the WGS84 and IERS 2003 ellipsoids are the same when rounded to six significant digits. An appropriate calculator for any latitude is provided by the U.S. government's National Geospatial-Intelligence Agency (NGA).

Another approximation of a longitudinal degree at latitude $\phi$, is:

$$\left(\frac{\pi}{180}\right) a \cos(\beta)$$

where Earth's equatorial radius a equals 6,378,137 m and $$\tan\beta = \frac{b}{a}\tan\varphi,$$

for the GRS80 and WGS84 spheroids, b/a calculates to be 0.99664719. ($\beta$ is known as the parametric or reduced latitude).

This gives the same distance as the formula above, which (aside from rounding) is the exact distance along a parallel of latitude; getting the distance along the shortest route will be more work, but those two distances are always within 0.6 meter of each other if the two points are one degree of longitude apart.

| Latitude | Surface distance per 1° change in Latitude | Surface distance per 1 minute change in Latitude | Surface distance per 1° change in Longitude | Surface distance per 1 minute change in Longitude |
|---|---|---|---|---|
| 0° | 110.574 km | 1.843 km | 111.320 km | 1.855 km |
| 15° | 110.649 km | 1.844 km | 107.551 km | 1.793 km |
| 30° | 110.852 km | 1.848 km | 96.486 km | 1.608 km |
| 45° | 111.132 km | 1.852 km | 78.847 km | 1.314 km |
| 60° | 111.412 km | 1.857 km | 55.800 km | 0.930 km |
| 75° | 111.618 km | 1.860 km | 28.902 km | 0.482 km |
| 90° | 111.694 km | 1.862 km | 0.000 km | 0.000 km |

Converting Longitude and Latitude to Tile Codes

Since the resolution of 1 arc minute×1 arc minute is being used to represent a tile (approximately 1.8 km×1.8 km at the equator), the tile unit of the X-Y Cartesian coordinate system will start from latitude 0 degrees and longitude 0 degrees. The range of the contiguous United States (CONUS) domain ranges from 130° to 60° W longitude and 25° to 50° N latitude. This yields 4200×1500 possible tiles to cover the United States and 21,600×21,600 tiles to cover the entire planet. Furthermore, many of these tiles, approximately 70 percent, would almost never be used since terrain such as desert, tundra, and water-covered areas are not inhabited.

1. X-Y Cartesian Coordinate System
   a. Unit: minute
   b. X axis: longitude
   Y axis: latitude
   Origin: a given ($lat_0$, $lon_0$) will be set to (latitude 0 degrees and longitude 0 degrees)
2. Longitude Conversion to the Tile X Coordinate
   The Tile X coordinate represents the longitude, starting at longitude 0 (Greenwich mean) and wrapping around the globe.
   Case 1
   If the longitude is positive (East), then
   Tile X=longitude*60
   For example, where longitude=35°
   Tile X=longitude*60=02100
   Case 2
   If the longitude is negative (West), then
   Tile X=(longitude+360°)*60
   For example, where longitude=−125°
   Tile X=(longitude+360°)*60=14100
3. Latitude Conversion to Tile Y Coordinate
   The Tile X coordinate represents the longitude, starting at longitude 0 (Greenwich mean) and wrapping around the globe.
   Tile Y=(latitude+90°)*60
   For example, where latitude=−65°
   Tile Y=(latitude+90)*60=01800
4. Longitude/Latitude Grid (LLG) Tile Name
   Format:
   $LLGX_1 X_2 X_3 X_4 X_5 Y_1 Y_2 Y_3 Y_4 Y_5$
   Value:
   $X_1 X_2 X_3 X_4 X_5$ is the 5 digit representation of the tile's longitude coordinate (in minutes) of its low-left corner in a Mercator projection in accordance with certain embodiments.
   $Y_1 Y_2 Y_3 Y_4 Y_5$ is the 5 digit representation of the tile's latitude coordinate (in minutes) of its low-left corner in a Mercator projection in accordance with certain embodiments.
5. Procedure of Processing Clients' Longitude and Latitude Coordinates
   Convert longitude to Tile X coordinate
   Convert latitude to Tile Y coordinate
   Use the converted Tile X and Tile Y coordinates to construct the Tile Name (i.e. LLG1410001800 using the example above)
   Example:
   A location where the longitude is 97.797° West and the Latitude is 35.772° North in Oklahoma and the result would be LLG1573207546.
6. Procedure of Retrieving a Devices' Approximate Location from the LLG Tile is Simply to Reverse the Process.

Converting National Weather Service (NWS) Universal Geographic Codes to Tile Codes Since the National Weather Service issues alerts based on VTEC bound boxes, Zone codes or County codes, the Alert Service will need to convert the geographic areas into a collection of "Tiles" used to approximately represent the alert locations.

In the cases of UGC Zone and county codes, these are done by preprocessing a vector-based "shape file", which can be found at http://www.nws.noaa.gov/geodata/catalog/wsom/html/pubzone.htm, that represents the National Weather Service UGC (Universal Geographic Code) locations for all known locations and generating tiles and storing them into a database that cross references the UGC code to a collection of tiles. This way alert requests received to the server will take the alert UGC code and perform a database query that matches the UGC codes and retrieves "Tile" codes. These tile codes are then in turn used to perform queries on the Target device and location database, which is indexed by Tile Codes to retrieve target alerting devices to receive notifications in turn alerting the user of those devices. This will maintain accuracy within 2 miles of the target location while maintaining high speed response time to a larger volume of devices.

Figure 11:
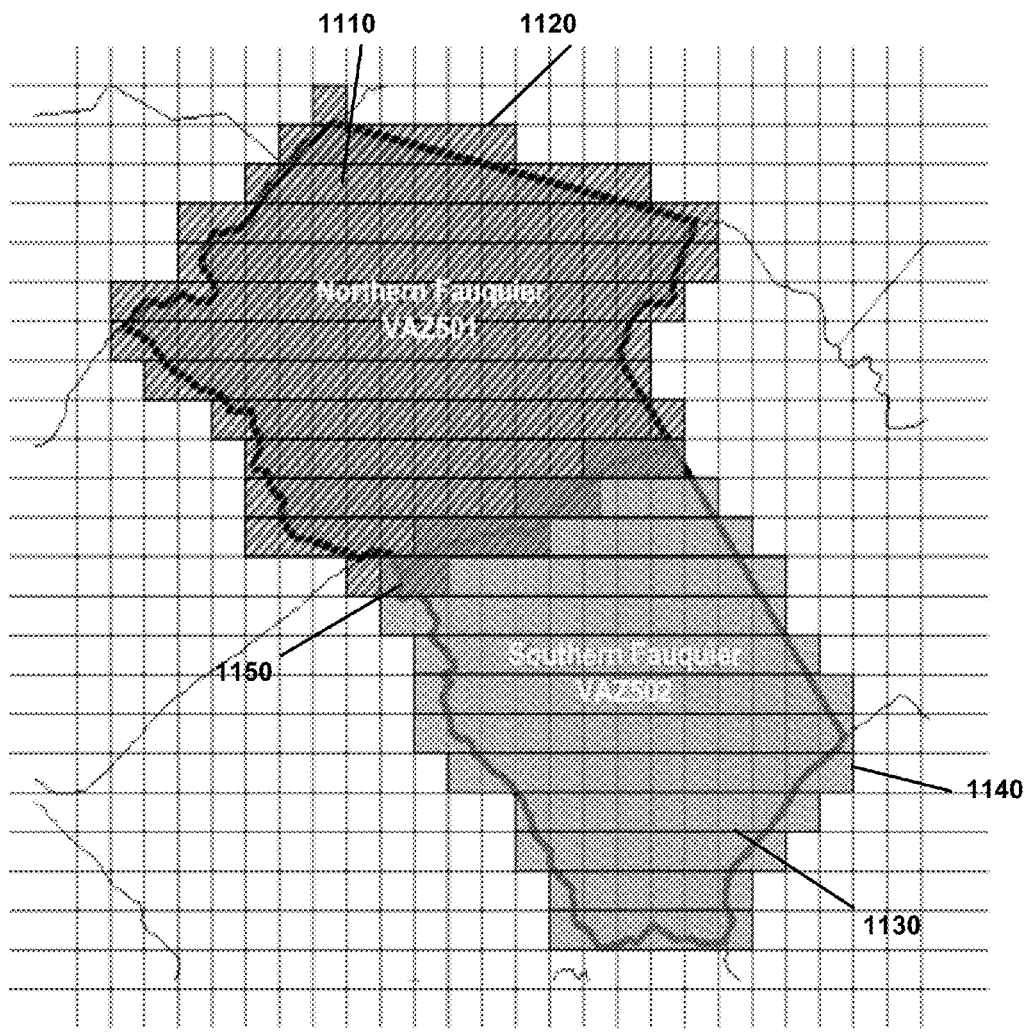
FIG. 11 illustrates a tile grid overlay over a map image, in accordance with various representative embodiments.

The illustration of FIG. 11 shows two (2) UGC areas (VAZ501 and VAZ502) with an example of a tile grid overlay over the image. The map area 1110 designates the VAZ501 area and the map area 1130 designates the VAZ502 area. Each of the tiles overlaying at least a portion of a map area would be associated with the corresponding UGC areas. Thus it can be seen that the tiles of the collection of Tiles 1120 overlay or border at least a portion of the VAZ501 area, while the tiles of the collection of Tiles 1140 overlay or border at least a portion of the VAZ502 area. As show below also, there are several tiles 1150 on the border of these areas that belong to both UGC areas.

In the case of VTEC bounding boxes, a VTEC polygon is approximately converted into a collection or set of tiles using the maximum and minimum latitude and longitude construct a collection of Tile Codes associated with the VTEC alert. Once this is done, the Tiles are further reduced to closely match the polygon before the query to the database is made. The result of the database query yields a collection of tiles that can yield alerting device described in the previous paragraph.

Functional Description

Certain embodiments described herein use a device, such as a mobile device, with Location Based Services, a Device Location Database, a Notification Server/Services that pushes notification to a device (such as by way of example and not limitations, SMS and/or Push notification services like the Apple Push Notification Service), Alert Servers, and Text-to-Speech Server. Below is a flow of events that further describe the methodology, system, apparatus and device functionality.

An exemplary high-level system flow diagram is shown in system 100 of FIG. 1. System Flow diagram 100 of FIG. 1 illustrates the flow that an alert notification, also referred to as a message, text message, notification or a notification message, follows through the system 200 of FIG. 2. Note that the encircled numerals 1, 2, 3, 4, 5*a*, 5*b*, 5*c*, and 5*d* in FIG. 1 correspond to the flow numerals below:

1. The Alert Service Provider 105 sends the notification to Alert Processing Server 110 of the system 100 that an Alert is issued by a system, agency, or data provider. This notification is received by the system and stored in the Alert Database 115.

2. The Alert Service Notification Server/Service 120 is notified by the Alert Database 115 that a message was stored.
   a. The Alert Service Notification Server 120 retrieves the Alert from the Alert Database 115 and determines what "Tile Codes" are representative of tiles affected by the Alert.
   b. The Alert Service Notification Server 120 then retrieves from the Alert Database 115 a listing of all of the devices that are looking for notifications in the affected tiles of the Alert. This may be accomplished by a simple database query of the Tile Codes associated with the locations of one or more registered Devices that are stored in the Alert Database.
   c. The Alert Notification Server 120 then formats the text of the Alert, processes the Text-to-Speech conversions of the Alert and stores a link to the audio file of the Alert within the Alert Database 115.
   d. The Alert Notification Server 120 then formats the alert text and places a text notification, an alert identifier (ID) and the device identifiers (IDs) of the one or more of the identified target devices into an alert notification queue to be retrieved by the Communications Gateway (COMM Gateway) Server(s) 125 to deliver the text message to the one or more affected target device(s) 130 located within the Tiles of interest that are affected by the Alert. While a text portion of the alert may be processed to generate or associate an audio version of the alert, other portions of the alert may be processed to generate a media version of the alert and said media versions of the alert could include text, audio, video (moving imagery), and photos (still imagery). In such a case, a retrieved portion of the alert is processed to generate or associate a media version of the alert and a reference identifier of the media version of the alert is placed into the alert notification queue.
3. The COMM Gateway Server(w) 125 retrieves the target device identifier (ID) for each of the one or more affected target Devices 130, alert text, and alert ID from a queued message and transmits the message using push notification services, Simple Messaging Services (SMS), or other text transmission mediums to the target Device(s) 130.
   a. In the case that the transmission fails, the COMM Gateway Server(s) 125 will try an alternate method of delivery if defined in the queue managed by the Alert Notification Server 120.
      i. An example would be a case in which a message is to be delivered to a Device 130 using the Apple Push Notification Service (APNS); the message could have in the Alert Database 115 a defined alternate method available such as Simple Messaging Service (SMS). In the example case, the COMM Gateway Servers 125 would attempt to read the database using the device ID and determine if an alternate method of delivery is defined, in this case SMS, and place the message into the appropriate queue to be sent to the Device 130.
4. Once the Device 130 receives the alert text notification message, the device will process the text message at the operating system level and notify the alert applications of the Device that have registered to receive messages from the device notification service provided by the Alert Notification Server 120.
5. The Device 130 will then process the text message, which will include the alert text, affected Tile(s) and alert identifier at a minimum. As shown in Block 135 of the drawing, the Device 130 may call a web-based service to obtain the alert data.
   a. The application operating on the mobile device will download the complete alert information from a server using the provided alert identifier. As shown in Block 140 of the drawing, the Device 130 may call a web-based service to obtain audio file(s) for the Alert.
   b. The alert information is cached locally on the device for future reference, either in file or database form, in the Device Database 150 as shown at Block 145.
   c. If the Device 130 or a location monitored by the user of the Device 130 is in the affected area of the Alert, then:
      i. The alert text will be shown to the user.
      ii. Alert audio of the Alert will be played, if supported and supplied
      iii. If a user requests, the text version of the Alert will also be available for viewing along with a geographical map representation of the affected area of the Alert.
   It can be seen from the drawing that the current location of the Device 130 is obtained at Block 160; this may occur after a wake-up device event at Block 155. If the determined device location is within the affected Alert area(s), as determined at Decision Block 165, then the user is notified of the Alert at Block 170 and given the opportunity at Decision Block 175 to decide whether to view the Alert details. The Alert details may be displayed to the viewer/user at Block 190 via a display Alert detail screen, various embodiments of which are discussed below and illustrated in the drawings. If the user does not wish to view Alert details, then the flow from Decision Block 175 continues to Block 180, where a timer can be set to wake-up the Device at intervals, such as five minute intervals.
      d. A timer of the Device is set for a configurable amount of time and then step 5c is performed again, as reflected at Blocks 185 and 195.

As used herein, the terms service and server may be used interchangeably. For example, an Alert Processing Service may make use of an Alert Processing Server and the Alert Processing Server itself may provide the Alert Processing Service. A similar observation may be made about Alert Notification Server and Alert Notification Service.

Figure 2:
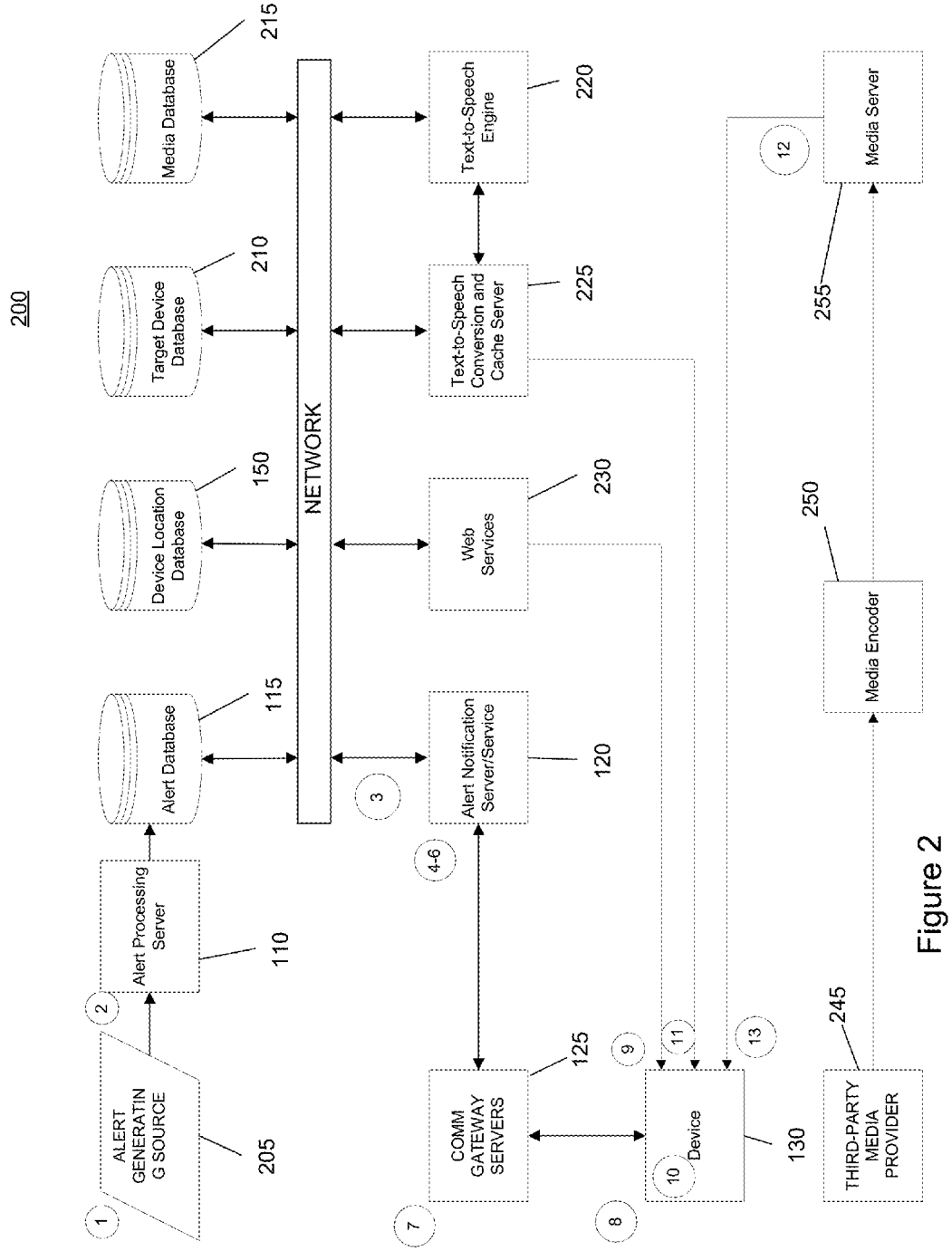
FIG. 2 is a block diagram of a system, in accordance with various representative embodiments.

A system block diagram is shown in FIG. 2. With reference to the system flow of FIG. 1 and the System Block Diagram 200 of FIG. 2, the following functional descriptions are consistent with certain embodiments described herein. Note that the encircled numerals 1-12 in FIG. 2 correspond to the flow numerals below:
1. At Block 205 the Alert Generating Source 205 is generated by an alerting agency and transmitted to the Alert Service Provider, shown as 110 in FIG. 1. The information contained in the alert will contain, but is not limited to, text representation of the alert event, location(s) associated with the alert event, start time and stop time of the alert event, and the severity of the alert event.
2. The Alert is processed by the Alert Processing Server 110 and stored in an Alert Database 115, which is used to prepare the alerts for being transmitted to one or more target Devices 130.
3. The Alert Notification Server/Service of Block 120 is triggered to read the Alert database 115 when a new alert is inserted by the Alert Processing Server 110.
4. The Alert data is then compared to Target Devices located in the Target Device Database 210, which is cross-referenced to the Device Location Database 150. If the Target Device 130 has a static location then the location is not cross-referenced, but used by the Alert Notification Server 120 to send the alerts. The Alert data may be payload information regarding one or more alerts that is sent from COMM Gateway Servers 125 to a device, for example.

5. Each target device entry of the Target Device Database 210 also has a corresponding device 130 that requested the alert, which will be used as the delivery device identifier when transmitting the alert to the Communication Gateway Server(s) 125.

6. The transmitted Alert data will contain an event identifier and basic text to identify the alert.

7. The Communication Gateway Servers 125 then take the transmitted alert and deliver the Alert data to the device 130.

8. The Device takes the Alert information received from the COMM Gateway Servers 125 and extracts the event Alert identifier (ID).

9. The Device requests additional event information from the Web Services 230 about the alert, which contains location specific information and time specific information about the Alert.

10. The Device then stores the collected information into a local device database.

11. The alert is displayed to the user, then the device will retrieve the media file(s) associated with the alert from the Text-to-Speech Cache server 225 and render the audio to the user using the Text-to-Speech Engine 220. The user is then given the option to view additional media provided by third-party media provider or vendors. The metadata associated with such third-party vendors is downloaded from the Media Server and rendered to the user for selection. Media available for viewing may be stored in Media Database 215.

12. Once third-party media is requested from the Media Server 255 based on the affected alert "Tile Code," the Device 130 will download a list of available alert media (such as photos or still imagery, video or moving imagery text, or audio) from the Media Server 255. The media may additionally include metadata, pre-formed data blocks (including proprietary data blocks), and photos or videos with tags for text and location, for example.

13. In the event that the user selects media to view from the list retrieved from the Media Server 255, the media will be downloaded or streamed to the device from the Media Server. Third-Party media may be provided by Third-Part Media Provider 245, encoded by Media Encoder 250 and stored or cached in Media Server 255 as shown.

Figure 3:
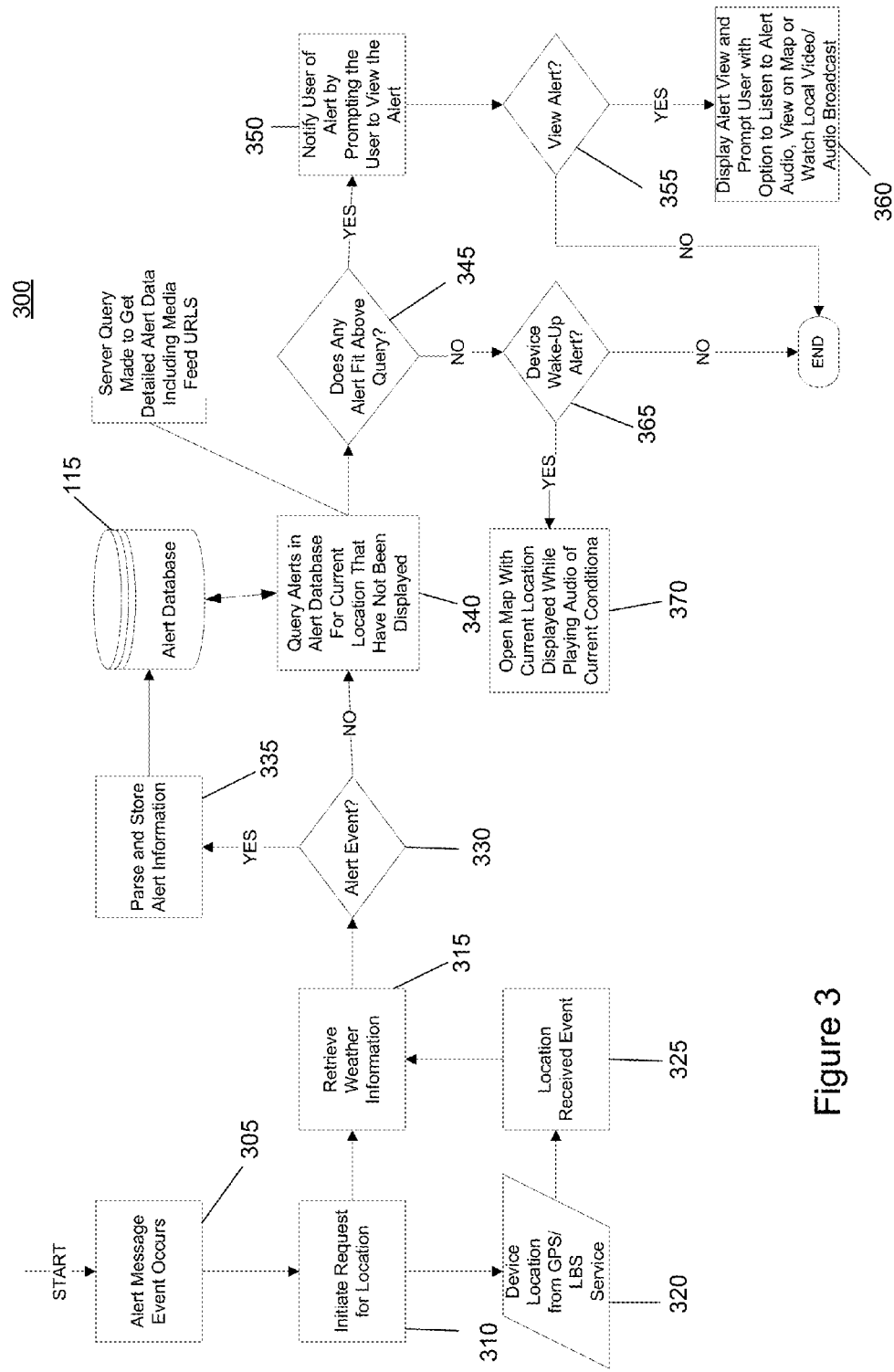
FIG. 3 is a flowchart of a mobile device flow, in accordance with various representative embodiments.

Referring now to FIG. 3, an exemplary device flow diagram 300 is shown in accordance with various embodiments. Alert delivery take places in two (2) phases: the registration phase and the alert notification phase. This section describes the registration and delivery of alert notifications to the device. There are two (2) different methods of each phase of delivering the alert to the device. These methods are separated by the device platforms that are being targeted, which may include public and third-party proprietary communication protocols and systems. For example, Apple, Inc.'s iPhone Apple Push Notification Service (APNS), Short Messaging Service (SMS), Real Simple Syndication (RSS) having text plus metadata, and Extensible Messaging and Presence Protocol (XMPP) communication protocols are just a few possible services contemplated. This does not preclude the addition of other text-based alert delivery mechanisms from being used in the future. Thus any text-message based service or system that can be sent to a mobile device as well as any event-driven message service that can be used to deliver a text-string to the mobile device is contemplated.

Referring now to Block 305, an Alert Message Event, such receipt by the device of an alert text notification message, occurs and at Block 310, the device initiates a request to determine the device location. This may be provided from a GPS or LBS service, for example, as shown at Block 320. At Block 325 the inquiry for the device is whether there is an alert or warning received for this location. Concurrently, weather information is retrieved by the device at Block 315 with input of the determined device location; retrieve information may include current weather conditions, forecast information, and alert information of the location. The current device location is converted to a tile and corresponding device tile code as previously discussed. At Decision Block 330, the inquiry is whether the event is an alert event; in other words, is the event one that rises to the level so that an alert or warning or other information is associated with it. If yes, then at Block 335, the alert information received by the phone is parsed and stored in an Alert database 115. This Alert database 115 may or may not be stored on the Device itself. If the inquiry at Decision Block 330 yielded a negative response, then at Block 340, the device queries the alerts in the Alert Database 115 for the current device location that have not yet been displayed by the Device, such as to a user of the device via a screen shot or other user interface of the device. As previously noted, a server query of a system server may be undertaken to obtained detailed alert data including Media Feeds via URLS. The database query of the Alert Database will identify one or more alerts stored in the alert database that have one or more alert geographical tile codes that match the device tile code representative of the current location of the device that have not been presented to a user of the device through a user interface of the device. Thus a search of all of the alert tile codes stored in the Alert Database for the device tile code will identify the alerts of interest to the device at its current location. The inquiry at Decision Block 345 is whether the query identifies any alert in the Alert Database 115 that fits the query made at Block 340. If yes, then at Block 350, the user of the device is notified of the new Alert by prompting the user to view the newly identified Alert. If the user chooses to view the alert at Decision Block 355, then the alert is displayed for viewing on the device and the user is prompted with an option to listen to audio describing the alert, to view on a map a radar view of the alert, and/or to watch a local video/audio broadcast concerning the alert.

Referring back to Decision Block 245, if no alert in the Alert Database 115 is found that fits the query at Block 340, then there is the option at Decision Block 365 of waking the device to listen to current location conditions while playing to the user an audio describing the current conditions associated with the current location of the phone at Block 370.

Registration Process

The goal of the registration phase discussed above is to notify the alert network that a device is available to be tracked and/or to receive alert messages. In this process, the device location and identification are collected and stored in the Device Location Database 150. Once the device location is collected, the system will then assign the device to a geographical region representing the location of the device called a Tile (described above), to create a virtual world grid having a sequence of 13 characters in length, where each square on the grid would represent approximately 2 miles square. As a result, this would make it easier for computing systems to maintain reasonable accuracy for the data while maintaining an efficient, easily searchable cache for alert data of interest, such as weather data.

Figure 4:
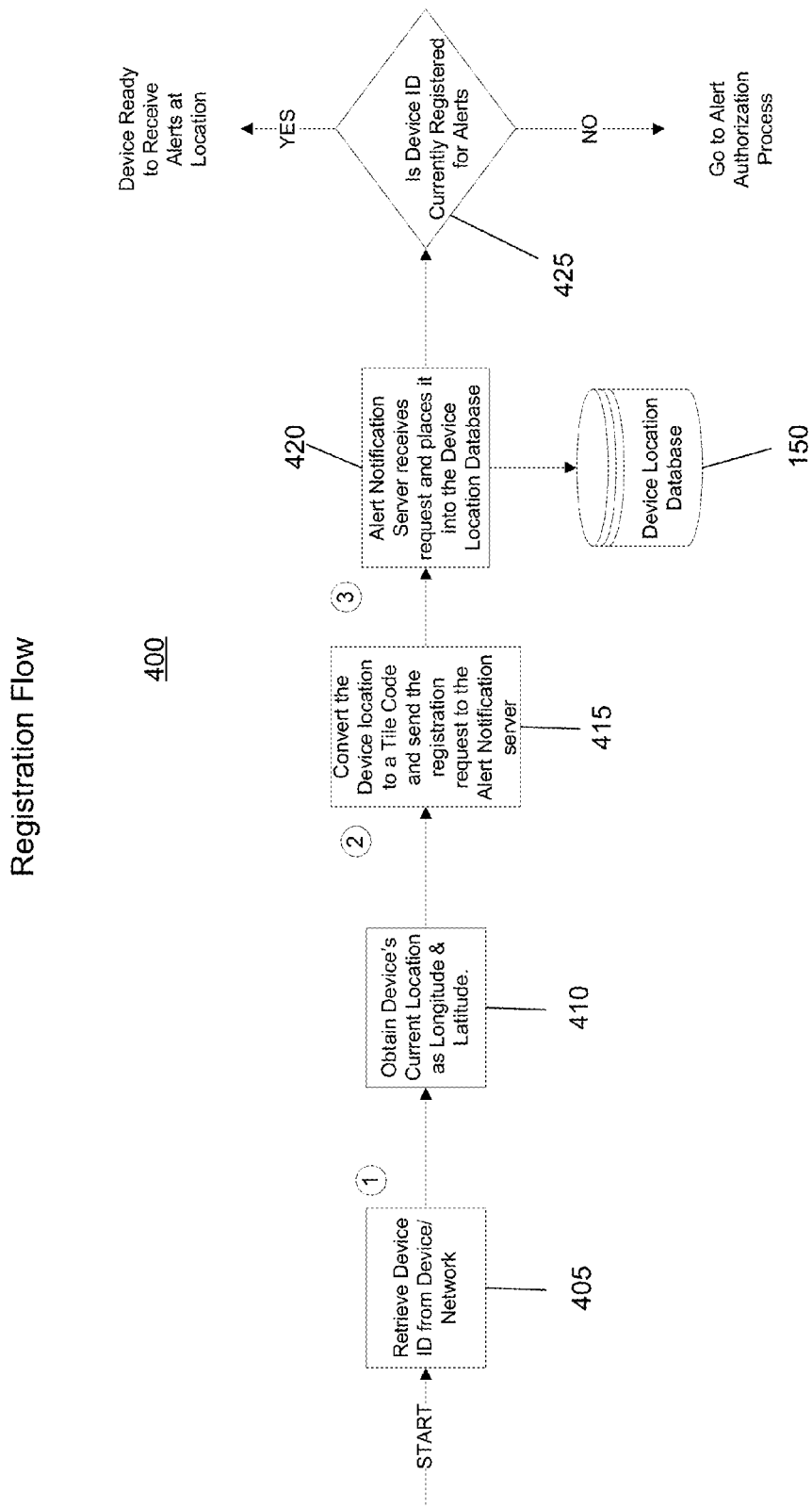
FIG. 4 is a flowchart of a registration flow, in accordance with various representative embodiments.

Referring now to flow diagram 400 FIG. 4, an exemplary registration process in which tile code information is used is illustrated in accordance with various embodiments. Note that the encircled numerals 1-3 in FIG. 4 correspond to the flow numerals below:

1. At Block 405, a Device ID is retrieved from the device or network to which the device is connected. The device ID, for example, may be embedded in the header of a transmission for some networks. The device ID may be an alphanumeric representation of the device on the network or a phone number associated with the device, in the case of a mobile phone, such as is useful in Short Message Service (SMS) messaging, for example.
2. At Block 410, the current location of a device is obtained. This may be obtained, for example, from cell-based Location Based Services (LBS) or GPS Satellite systems. At Block 415, the current device location is converted to a Tile Code and the registration request is sent to the system server. As previously discussed, this may involve converting converting the latitude and longitude coordinates of the device's location to a "Tile Code" used when sending the location of the device to the server.
3. The registration request is processed at the Alert Service Provider server by doing the following:
    a. Send the retrieved Device ID, the target device identifier, current Tile Code, and to the Alert Notification Server 120. The Alert Notification Server 120 receives the request at Block 420.
    b. The Notification Server 120 updates the Device Location Database 150 at Block 420 with the received Tile Code and device identifier of the device.
    c. At Decision Block 25, the Device ID is used to determine if the target device is currently registered to receive alerts. A second table may associate target devices to requesting devices along with an Active Flag. In this embodiment, this table is queried to determine where the target device and requesting device ID match the given target device ID. The goal is to see if this device ID has been registered to receive notification; a notification needs to be sent to an alarm application to authorize the requesting device to receive alerts for the targets location. If successful, store the Device ID for future reference in the Alerting Process.
    d. Query the table above for a row where the target device and requesting device IDs matches the web service request. If it does, then update the Device ID on this row. If the Active Flag is false, then start the Registration Authentication Process.

Registration Authorization/Alert Authorization

The goal of the registration authentication is to protect the privacy of device user(s) from someone requesting information about alerts at their device locations, thereby making it possible for unwanted information about the users' location to be accidentally revealed.

Figure 5:
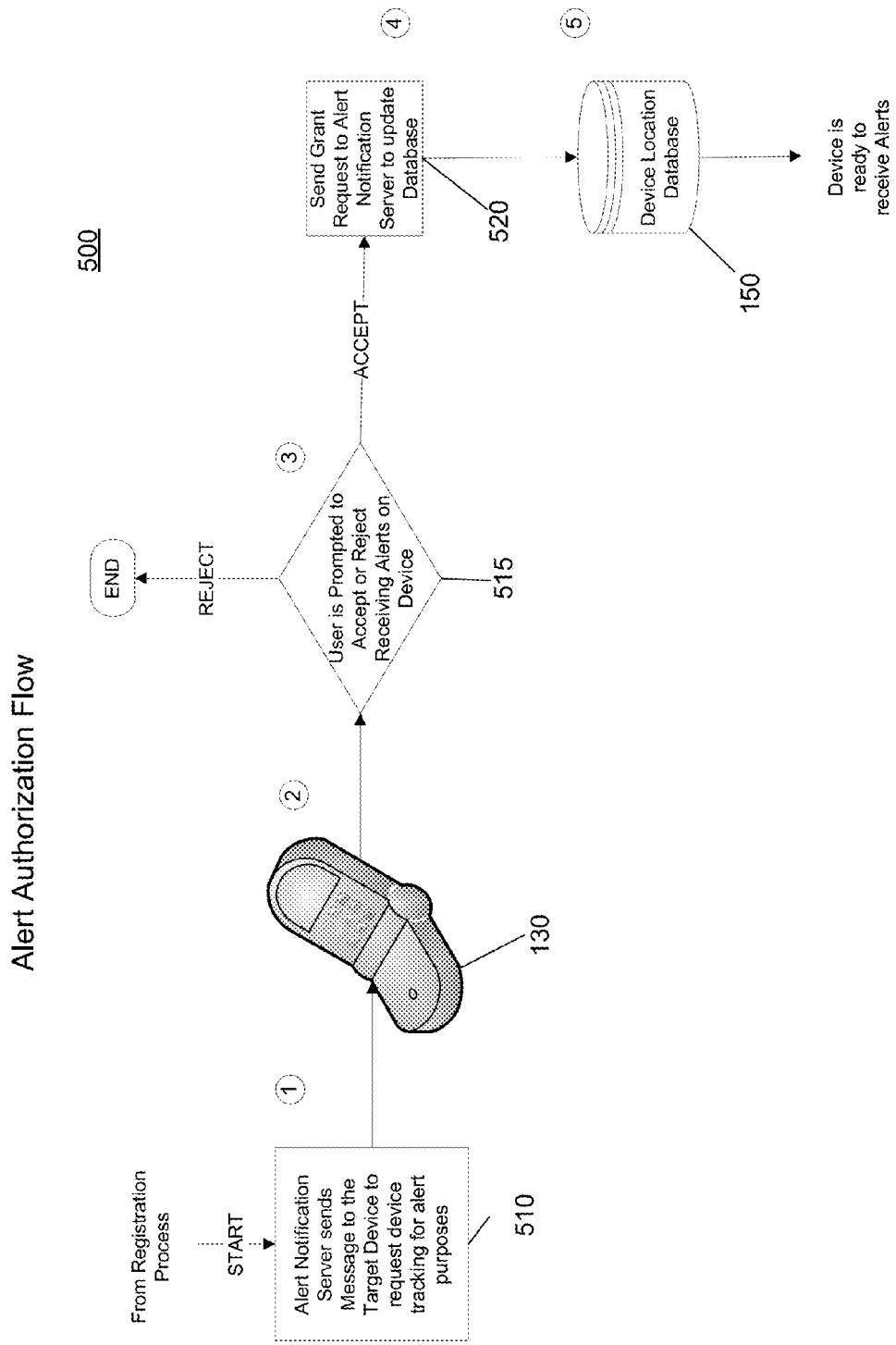
FIG. 5 is flowchart of an alert authorization flow, in accordance with various representative embodiments.

An exemplary Alert Authorization Process 500 is illustrated in the flow diagram of FIG. 5, in which an exemplary device is a mobile phone. Note that the encircled numerals 1-5 in FIG. 5 correspond to the flow numerals below:

1. Construct an authorization request text message to send to the user. This may involve the Alert Notification Server sending a notification message to the target device to request device tracking for alerts, as shown at Block 510.
2. The Notification server sends the message to the target device 130, in this exemplary embodiment the target device is shown as a mobile phone for illustration purposes.
3. The phone 130 receives the notification, prompting the user to either accept or reject the request for requesting phone number to receive emergency alerts based on their location. Thus, at Decision Block 515 the user is prompted to accept or reject receiving alerts on the device.
4. If the user grants the request and accepts to receive alerts, then at Block 520 the application will send the grant request to the Alert Notification Server 120 via SMS response, push notification response, web service, or other appropriate communications medium.
5. The Device Location Database 150 is updated to make the association between the two devices active. This process may be used for any number of target devices. The device is now ready to receive alerts.

Receiving an Alert

The Alert Notification phase is the process that enables a device such as a mobile phone to actually receive an emergency alert from the Alert Service Provider 105. The Alert Service Provider may be a Weather Alert Service Provider as was previously discussed.

Figure 6:
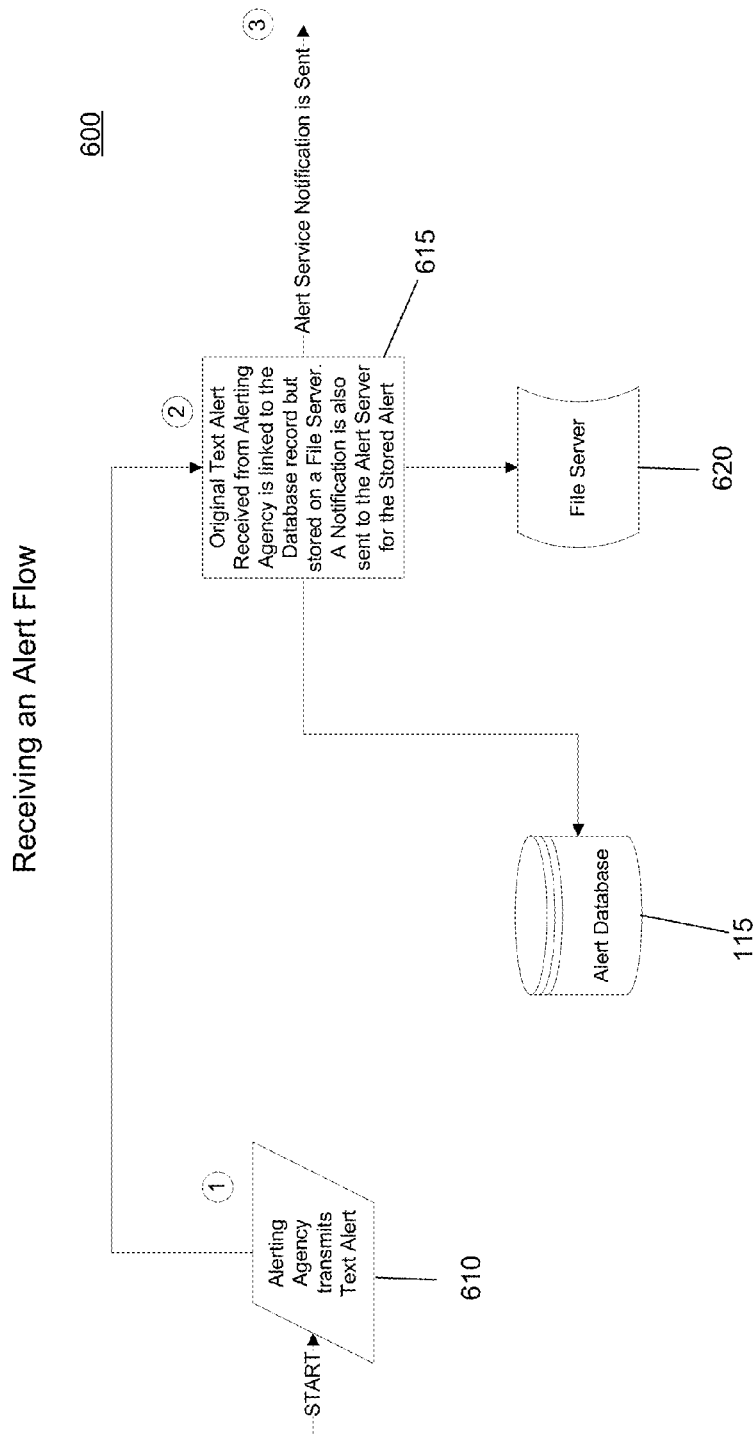
FIG. 6 is a flowchart of receiving an alert flow, in accordance with various representative embodiments.

This process begins when the Alert Service Provider 105 receives an emergency alert from an alerting source or system, which can be, by way of example and not limitation, The National Weather Service, US Geological Survey, US Department of Justice, Center for Disease Control, Lightning Decision server, Traffic Network, et cetera. Referring now to flow diagram 600 of FIG. 6, the process by which an alert is delivered and processed by the Alert Service Provider will be further described. Note that the encircled numerals 1-3 in FIG. 6 correspond to the flow numerals below:

1. At Block 610 the alerting source, shown here as an Alerting Agency 205, transmits an alert in the form of text to the Alert Service Provider 105. The Alerting Agency could also be a Weather Alert Service Provider, which is true in the case where analysis is able to predict a weather condition, such as lightning or other predictable weather condition, and then sent out an alert of the likelihood of such a predicted weather condition.
2. At Block 615 the original text alert received from the Alerting Agency 205 is linked to the database record and stored on a File Server 620. The Alert Processor or Alert Processing server 110 takes the Alert and extracts vital data (time of issue, duration of the alert, location effected by the alert, direction of a weather condition or threat, heading of a weather condition or threat, velocity of a weather condition or threat, severity of a weather condition or threat, estimated time of arrival (ETA) of a weather condition or threat such as lightning, estimated time of departure (ETD) of a weather condition or threat such as lightning, title of alert, and base text of the full alert. The extracted data is stored in the Alert Database 115 and the original file is linked to the database record and kept on the File Server 620. This allows the data to be pulled later and parsed as needed for additional alert information that may be newly relevant, given the changed location of the device. It is noted that alert data, such as duration, severity, ETA/ETD, of a weather condition etc. may be provided by a source other than the Alerting Agency 205, such as another software application running on the device, the Alert Service provider, etc.

3. A notification of the stored alert is sent to the Alert Notification Server, which generates the alert requests sent to the end user/device.

Alert Notification

Figure 7:
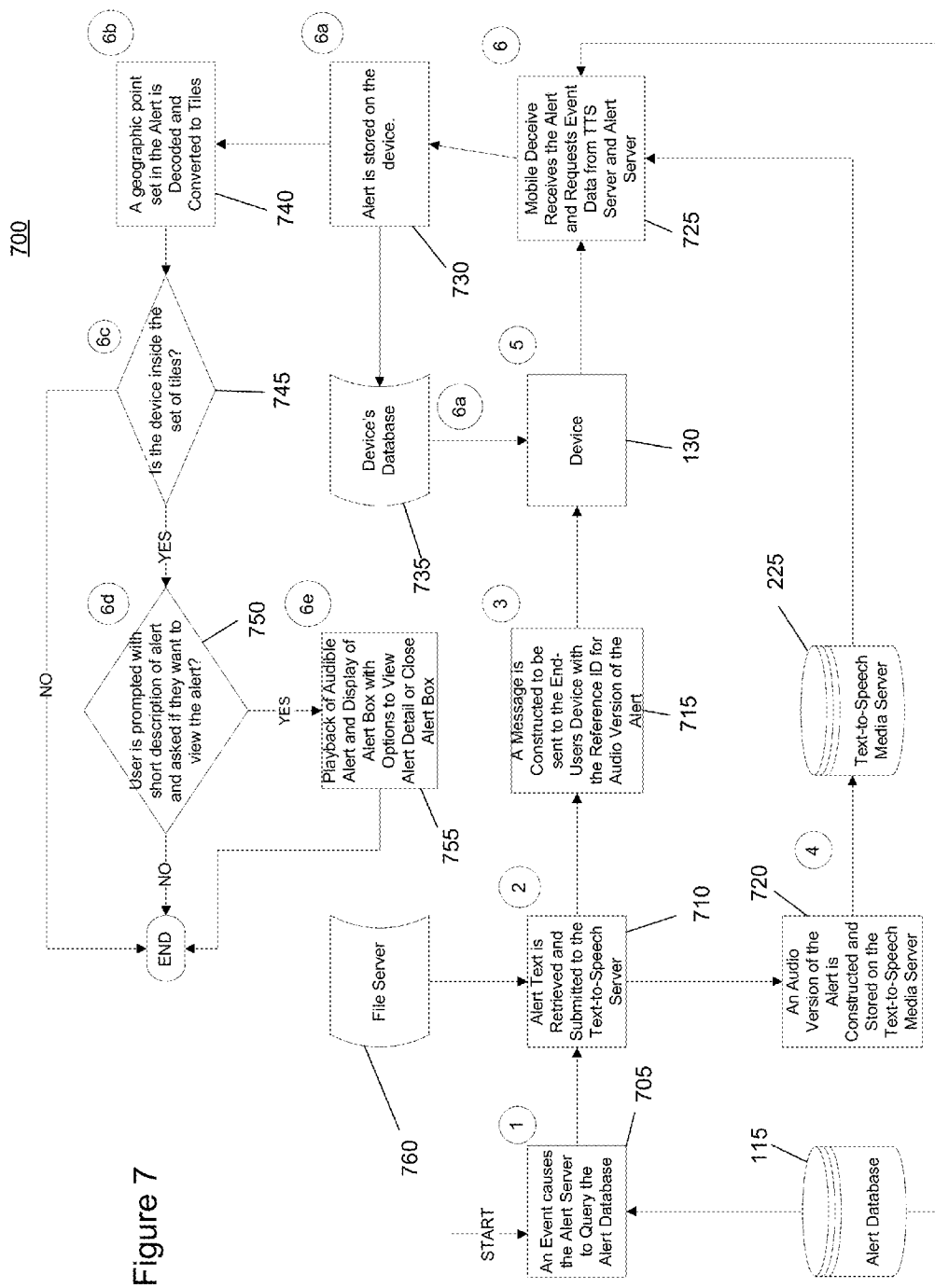
FIG. 7 is a flowchart of an alert notification flow, in accordance with various representative embodiments.

The Alert Notification phase enables a device to actually receive notification of an alert available to be retrieved from the Alert Service Provider 105. Referring now to FIG. 7, an exemplary alert notification process flow 700 of how the alert is sent to a device from the alert server is illustrated. Note that the encircled numerals 1-5 and 6*a*, 6*b*, 6*c*, 6*d* and 6*e* in FIG. 7 correspond to the flow numerals below:

1. At Block 705 an event causes the Alert Server to query the Alert database 115 for alerts. This query action may also be done automatically and periodically.
   a. The Alert information is retrieved from the Alert Database 115.
   b. The Location of the Alert is converted to one or more affected tiles, which may be referred to as a collection or plurality of tiles, which is then compared to the one or more tiles of interest of the Target Devices and static locations in the Target device database. The Target Devices can be both devices that are cross-referenced, using tile codes, in the Device Location Tables or static locations. The result of the comparison will yield only the registered device(s) that contain Target device entries that match the location of the alert. The resulting device or devices of this query will be the destination devices when sending the alert messages.
2. The alert text is retrieved and submitted to a Text-to-Speech Server or Module at Block 710.
3. A Message is constructed to be transmitted to the user of the device that includes a referencing identifier that allows the device to query for additional event information including the URL of the file containing the audio version of the alert at Block 715.
4. Moreover, at Block 720 an audio version of the alert is constructed and stored. For example, the audio file is received from the Text-to-Speech Server/Module and stored on the Text-to-Speech Media Server 225.
5. The alert message is sent to the device 130.
6. Next, at Block 725 the mobile device receives the alert and requests additional event data from the TTS Media Server 225 and Alert Database Server 115. This request for additional event data may be in response to user input received at a user interface of the mobile device. Once the event data is received, then the following process is followed:
   a. The alert is stored on the device at Block 730. As shown, this may be a database on the device as shown in Block 735.
   b. A geographic point set in the Alert is Decoded and converted to a set of tiles with corresponding set of tile codes at 740.
   c. The inquiry at Decision Block 745 is whether the device is inside the identified set of tiles determined at Block 740. If the device is inside the alert set of tiles, then proceed with displaying the alert if the user agrees.
   d. At Decision Block 750, The user is prompted with an abbreviated version of the alert and asked if they wish to view the full alert at Decision Block 750. If not, then processing the alert stops.
   e. If the user wishes to view the full alert, then at Block 755, playback of the audio alert and display of the alert box or panel with options to view the alert in detail occurs. The alert box may also be closed. Thus, in the alert box in which alert text is displayed to the user, buttons may be displayed allowing the user to view more information about the alert or to simply close the alert box. The user may therefore be notified using a combination of the audio alert information being played back to the user along with an alert box containing the alert text displayed to the user.

Retrieve Alert Media

One requirement of the Multimedia Alert System may be to link broadcasts of both audio and video supplied by third-party broadcasters to severe weather events. Too support this, each third-party broadcaster is required to record video and/or audio clips in formats such as Apple, Inc.'s iPhone or Google's Android platforms, or other platforms of interest can render and store an entry in a Media RSS file sorted according to time in descending order.

Thus, each entry in the Media RSS file may contain at least the following information: a thumbnail representing a first frame of video or the media clip; a brief description of the media clip; and a URL needed to retrieve the media clip.

Figure 8:
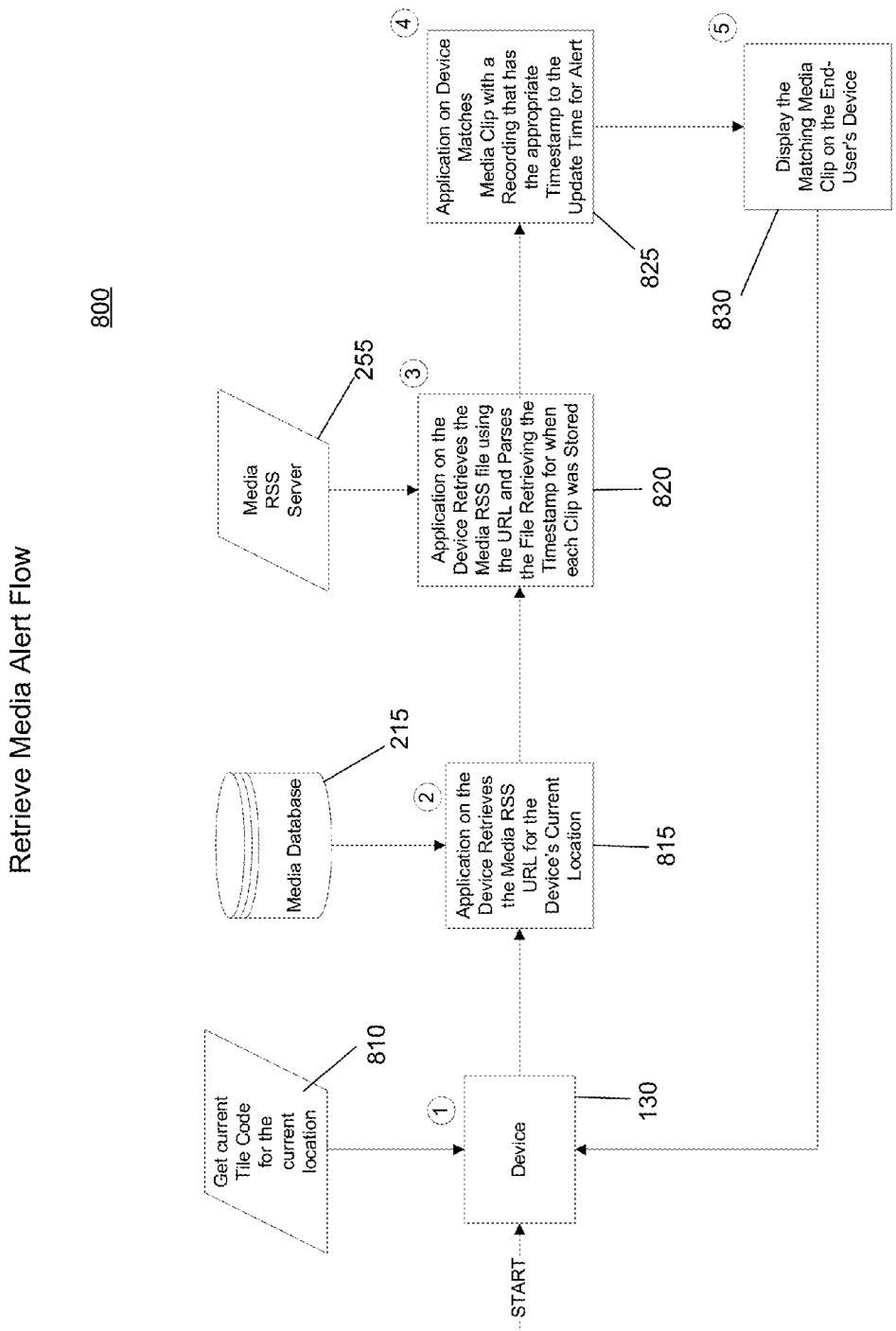
FIG. 8 is a flowchart of retrieving a media alert flow, in accordance with various representative embodiments.

Referring now to flow diagram 800 of FIG. 8, a retrieve media alert flow in accordance with various embodiments is disclosed. Note that the encircled numerals 1-5 in FIG. 8 correspond to the flow numerals below. Thus, when the user selects to view the local video about the alert, the following occurs in connection with certain embodiments:

1. The Device 130 obtains the current Tile Code for the devices' current location Block 810.
2. The application on the device retrieves the Media RSS URL for the current Tile from the Media Server Database 215 at Block 815.
3. The application on the device retrieves the Media RSS file from the Media RSS Server 255 using the URL and parses the file retrieving the title, time and location of each clip stored.
4. At Block 825, the application on the device matches the media clip with a recording that has the appropriate timestamp to the update time for the alert. Thus, the recording matches the following criteria: 1) the recording time is within 15 minutes of the update time of the alert; and 2) it is the closest time match to the alert.
5. The Mobile device then retrieves the actual media from the Media Server and then renders it on the Mobile device at Block 830.

Data Storage

Data for use in accordance with various embodiments of the Multimedia Alert Method, System, Apparatus and Device may be organized into two (2) databases: the Alert Database 115 and the Device Location Database 150. The data sets in each database may be as follows:

| Alert Database | Device Database |
| --- | --- |
| Alert Table: | Device Location Database Table: |
| Alert ID: auto number (key) | Device Identifier |
| Full Text of NWS alert - NWS Alert | APN Device ID (Used with iPhone Only): string |
| Title of NWS alert - NWS Header | Tile Code: string |
| Text Body of NWS alert - NWS Alert Text (between headers and '&&') | Media Database Table: id: auto number Tile Code: string |
| Event Identifier of the alert - | Media Metadata URL: string |

| Alert Database | Device Database |
| --- | --- |
| VTEC Header | Target Device Database Table: |
| Sequence number representing revision/update number of alert - Auto Generated | id: auto number |
| | Registered Device Identifier: string |
| Issue Time of the Alert - VTEC | Target Device Identifier: string |
| Last Update Time of the Alert - NWS Header | UGC Code Table: |
| | id: auto number |
| Expiration Time of the Alert - VTEC | NWS UGC County Code: string |
| | Tile Code: string |
| County Code of the Alert - NWS Location Header | |
| Phenomena Type -VTEC | |
| Significance Flag - VTEC | |
| Lat/Long Text Field - LAT . . . LON statement | |
| Alert Location Table: | |
| ID: auto number key | |
| Alert ID: foreign key (number) | |
| Tile Code: string (key with duplicates) | |

Battery Management

Based on battery status of a Device, a device application may alert the user to one or more features of the application that will consume significant amount of power thus allowing the user to prolong battery life in critical situations. For example, such low battery alerts may notify the user when they:

a. Select to view video on the device: an audio only broadcast option would be available.

b. The device would automatically reduce the "Update Rate" of the devices location to report location at a slower rate thus reducing the number of times a radio transmission is necessary.

c. In addition to reducing the device location "Update Rate", the accuracy of the update request also changes linearly from 10 meters using GPS to 3 kilometer accuracy using cell tower triangulation as the battery discharges. The accuracy of the requested location information will vary linearly from 10 meters at 100% battery capacity to 3,000 meters (3 km) at 40% of battery capacity remaining. For instance, when the battery is at full charge the requested location accuracy will be 10 meters from GPS satellite, at 80% charge left the device will request an accuracy of 1,000 meters (1 km), at 60% charge left the device will request an accuracy of 2,000 meter accuracy and switch to Cell Tower triangulation, and then at 40% of battery capacity left the accuracy would become 3,000 meter (3 km).

Figure 9:
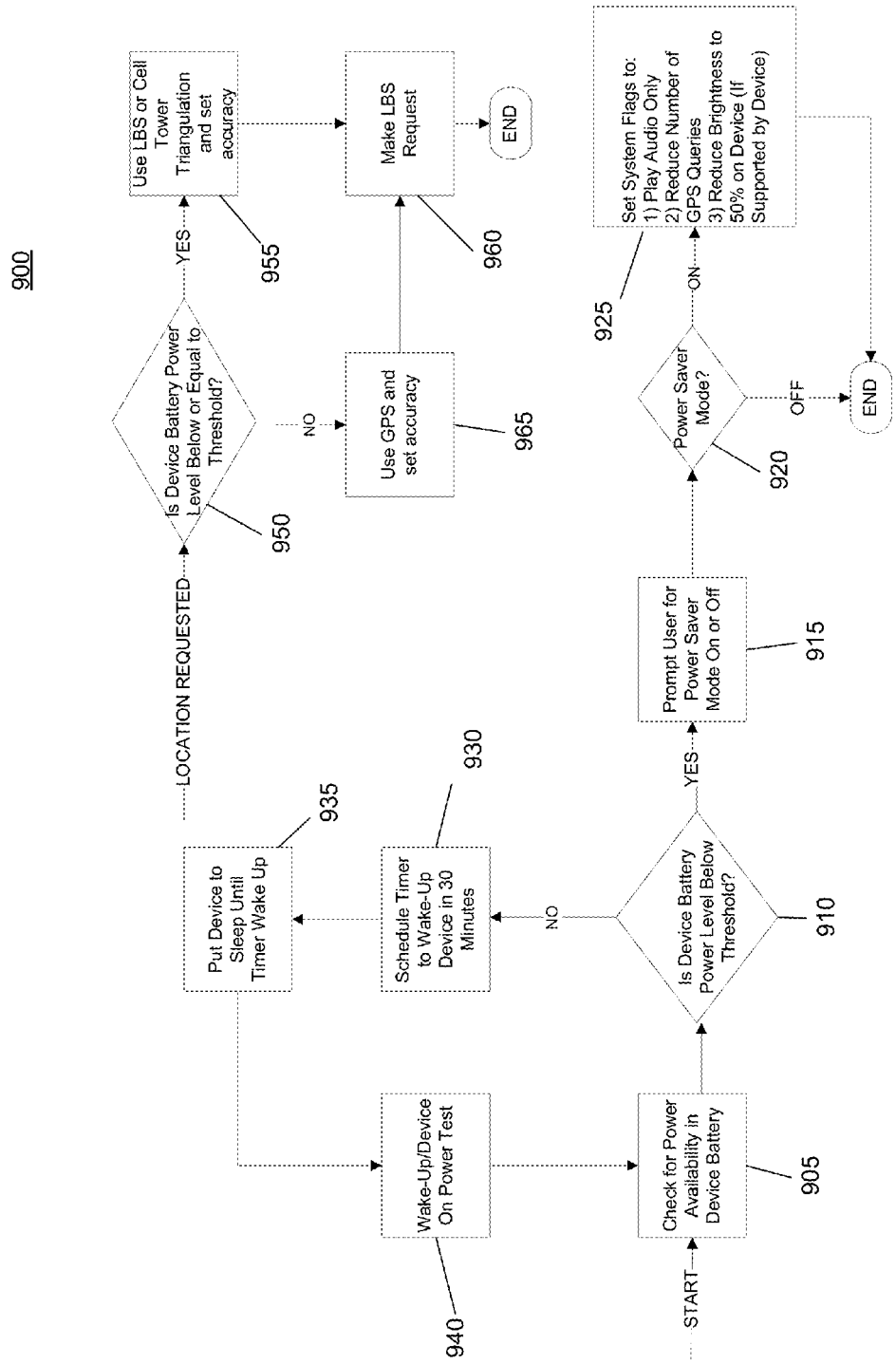
FIG. 9 is a flowchart of a battery management flow, in accordance with various representative embodiments.

An exemplary Battery Management flow diagram 900 is illustrated in FIG. 9. At Block 905, a check for power availability in the device battery is undertaken. If at Decision Block 910 it is determined that the Device battery power level is less than some threshold, such as less than 40%, for example, then at Block 915, the user is prompted to activate a power saver mode of the Device. At Decision Block 920, if the user chooses to enter/activate the Device's power saver mode, then at Block 925 various system flags may be set to activate the power saver mode. As shown, some examples of power saver mode actions may be to play audio only, reduce the number of GPS queries undertaken, reduce the brightness of the Device screen to some level, such as 50%, for example, if supported by the Device.

If the current battery power level of the Device is not below the threshold, then the flow continues to Block 930 to schedule a timer to wake-up the Device, such as in 30 minutes. The device is then put into its sleep mode at Block 935 until the timer wakes it up. The Device wakes-up at Block 940; this may occur by operation of the timer or upon power-up of the Device.

Power conservation of the Device may be triggered upon a request of the location of the Device. At Decision Block 950, the inquiry after a location request might be whether the device battery power level is less than or equal to a threshold, such as 60%. If yes, than at Block 955, LBS or cell tower triangulation may be used to lower the accuracy obtained in the location determination. The LBS request is made at Block 960. Again, this level of decreased accuracy may be perfectly acceptable within lesser degree of accuracy needed for the Tile Code regime. If this is not acceptable, than at Block 965, GPS is used and the accuracy achievable with GPS location determination may be set.

Lightning Alerts

In accordance with various embodiments, the lightning alert is generated based on the probability that lightning will strike a given location based on data. These alerts are delivered to the alert system from system servers at an Alert Service Provider and other lightning networks.

How Lightning Alerts are Triggered

Lightning information is gathered by lightning detectors from third-party networks and that information is supplied to the Alert Service Provider for analysis. The information supplied from the lightning networks given the approximation of the location of lightning strikes in longitude and latitude coordinates along with the time that the strike was recorded. The lightning alert is triggered based upon the frequency or strikes within a given time period at a given location.

Figure 10:
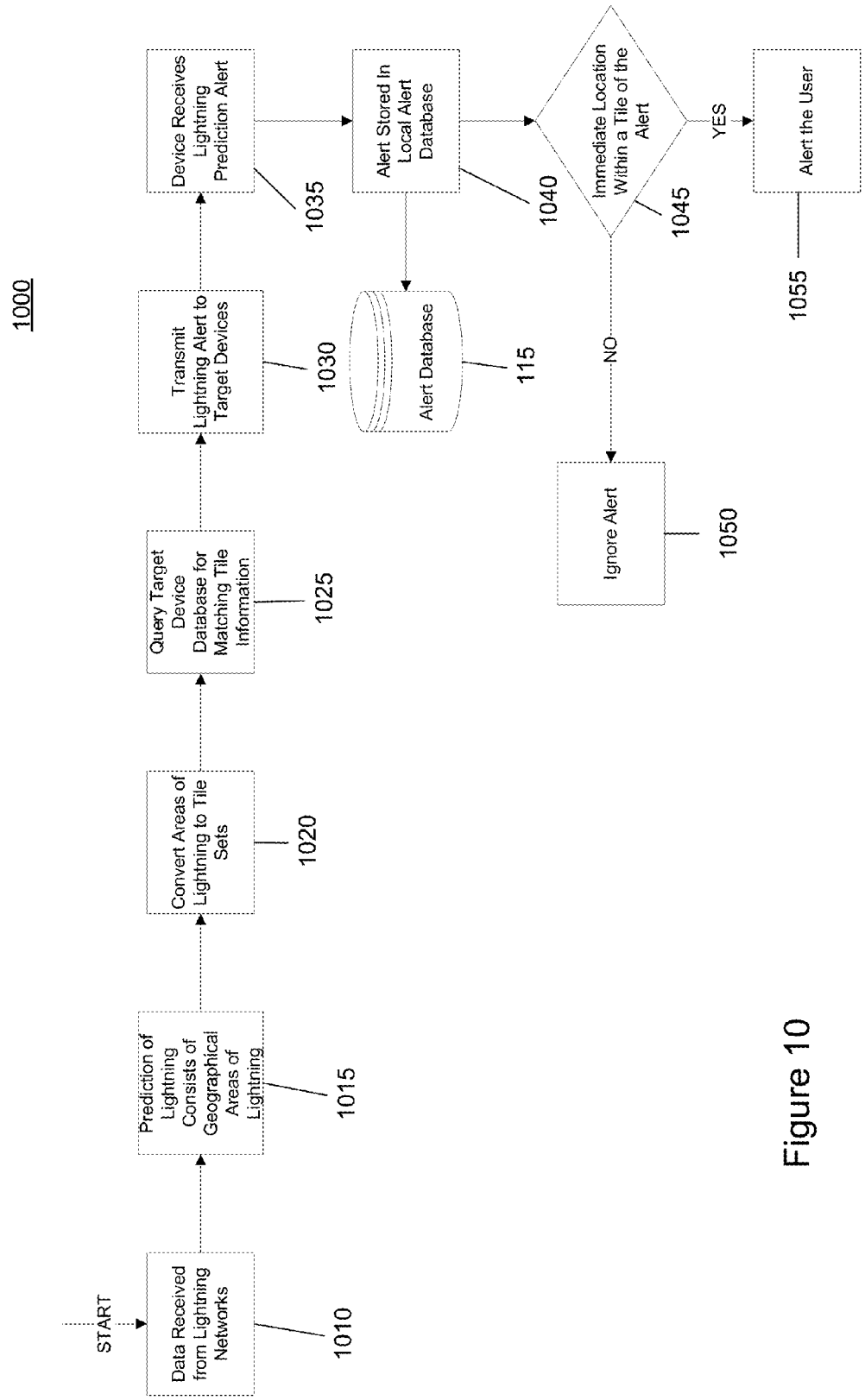
FIG. 10 is a flowchart of a lightning prediction flow, in accordance with various representative embodiments.

An exemplary lighting prediction flow diagram 1000 is illustrated in FIG. 10. At Block 1010, data is received from lightning networks, source networks for lightning information. At Block 1015, a prediction of lightning activity or events, such as lighting strikes, consisting of geographical areas of lightning activity, is undertaken. The geographical areas of the lightning activity is converted to Tile Sets and corresponding Tile Code information at Block 1020. At Block 1025, the Device Location Database 150 is queries for matching Tile information. At Block 1030, one or more lightning prediction alerts may be transmitted to target Devices having matching Tile information. The Device receives the lightning prediction alert at Block 1035. The Alert may be stored in the local Alert Database 115 at Block 1040. At Decision Block 1045, the inquiry is whether the immediate or current Device location falls within a tile of the lightning prediction alert. If so, then the user of the Device is alerted at Block 1055. If not, than the lightning prediction alert is ignored at Block 1050.

Figure 25:
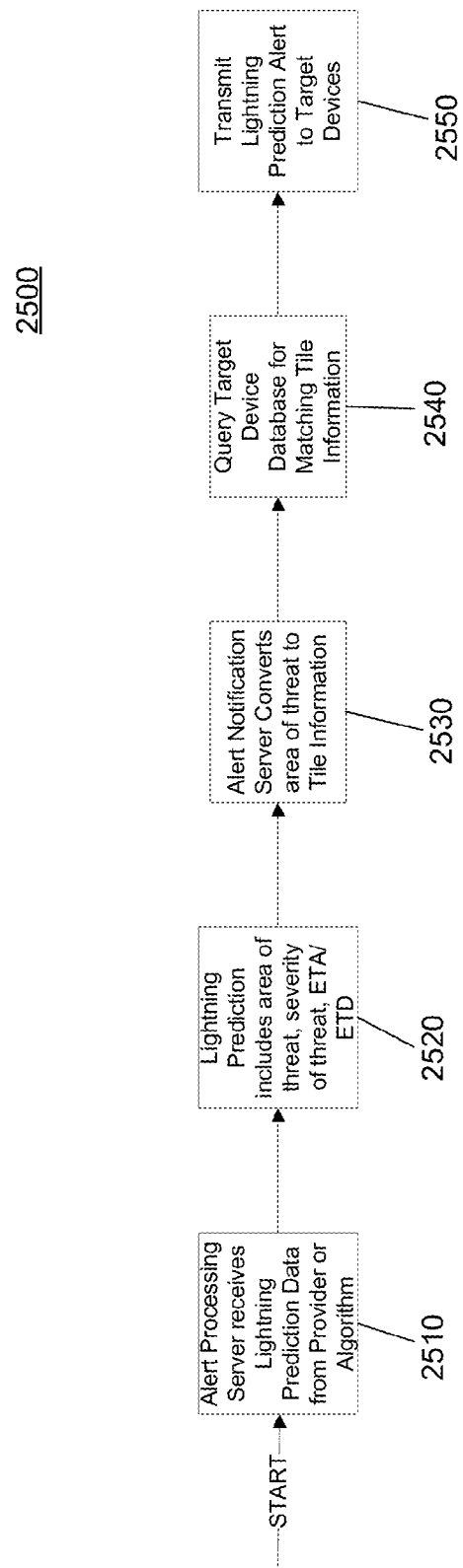
FIG. 25 is a flowchart of a lightning prediction flow, in accordance with various representative embodiments.

Referring now FIG. 25, a flowchart of a lightning prediction flow 2500, in accordance with other various representative embodiments, is shown. At Block 2510, the Alert Processing Server receives lightning prediction data from an alert provider or algorithm and that lightning prediction data is used to define the lightning prediction. At Block 2520, the lightning prediction includes valuable information, such as area of lightning threat, severity of lightning threat, and the ETA/ETD of the lighting threat. At Block 2530, the Alert Notification Server converts the area of threat to tile code information, as previously discussed. At Block 2540, the target device database is queried for matching tile information. The lightning prediction alert is transmitted to one or more target devices at Block 2550.

Device Graphical User Interface

Examples of user interfaces, with description, for a user of a device, shown as a mobile phone, are provided in the screen shots of FIGS. 12-24. The screen shots are generated, controlled and rendered to a user of the mobile phone by a weather alert application running on the mobile phone.

Figure 12:
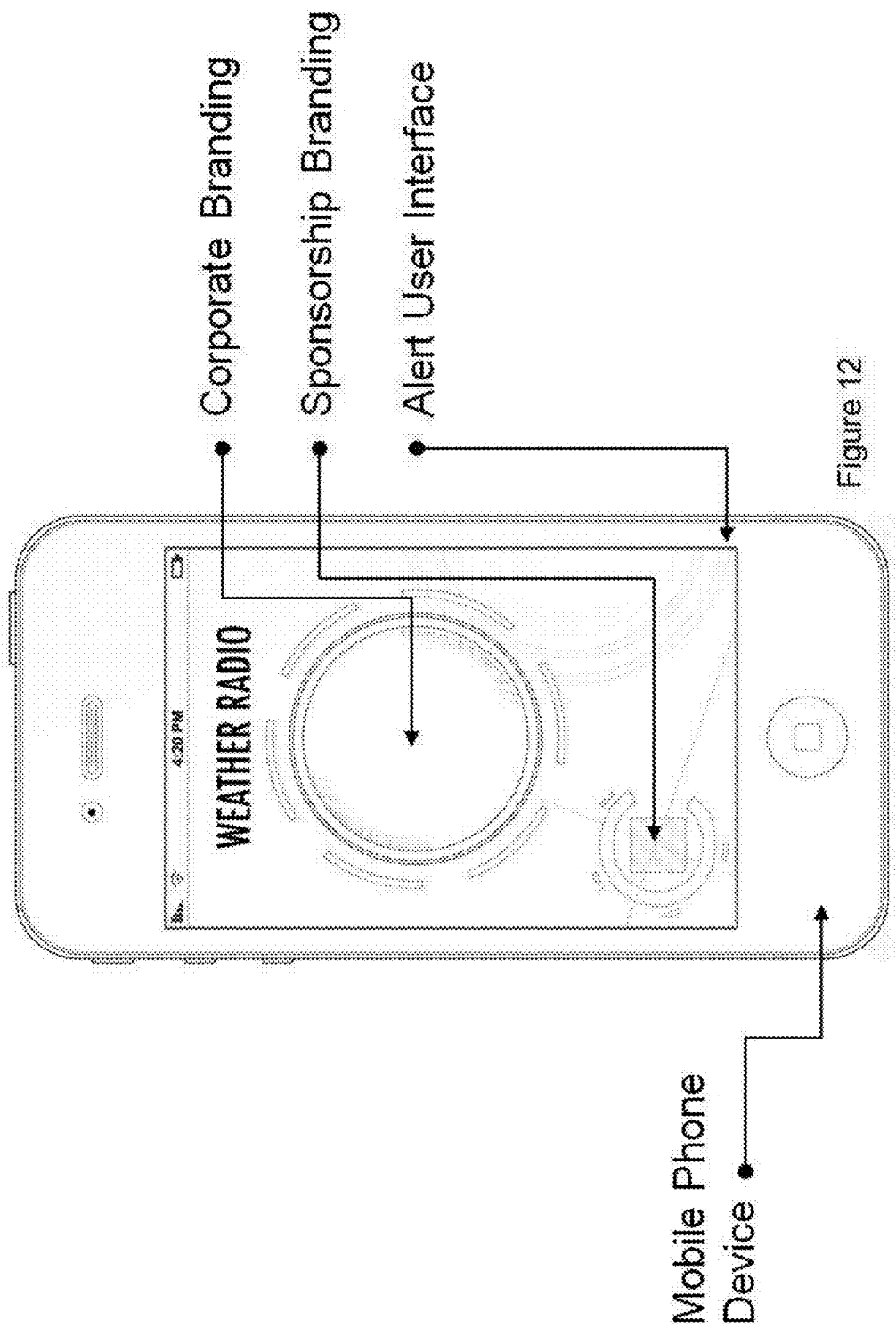
FIGS. 12-24 are screenshots of various user interfaces of an alerting application, in accordance with various representative embodiments.

Referring now to FIG. 12, an illustration of a mobile device that is under control of a weather application to operate as a weather radio to provide weather information and alerts to a user of the mobile phone via a user interface is shown. The alert application running on the mobile phone causes a splash screen to be displayed to a user of the device that may have information such as corporate branding and sponsorship branding displayed as shown. Corporate and sponsorship branding are useful in partnering with sponsors or third-party local, regional or national media providers to provide alerts. This screen may appear if the user launches the application without an alert, such as a severe weather alert waking up the phone via a pop-up screen.

Figure 13:
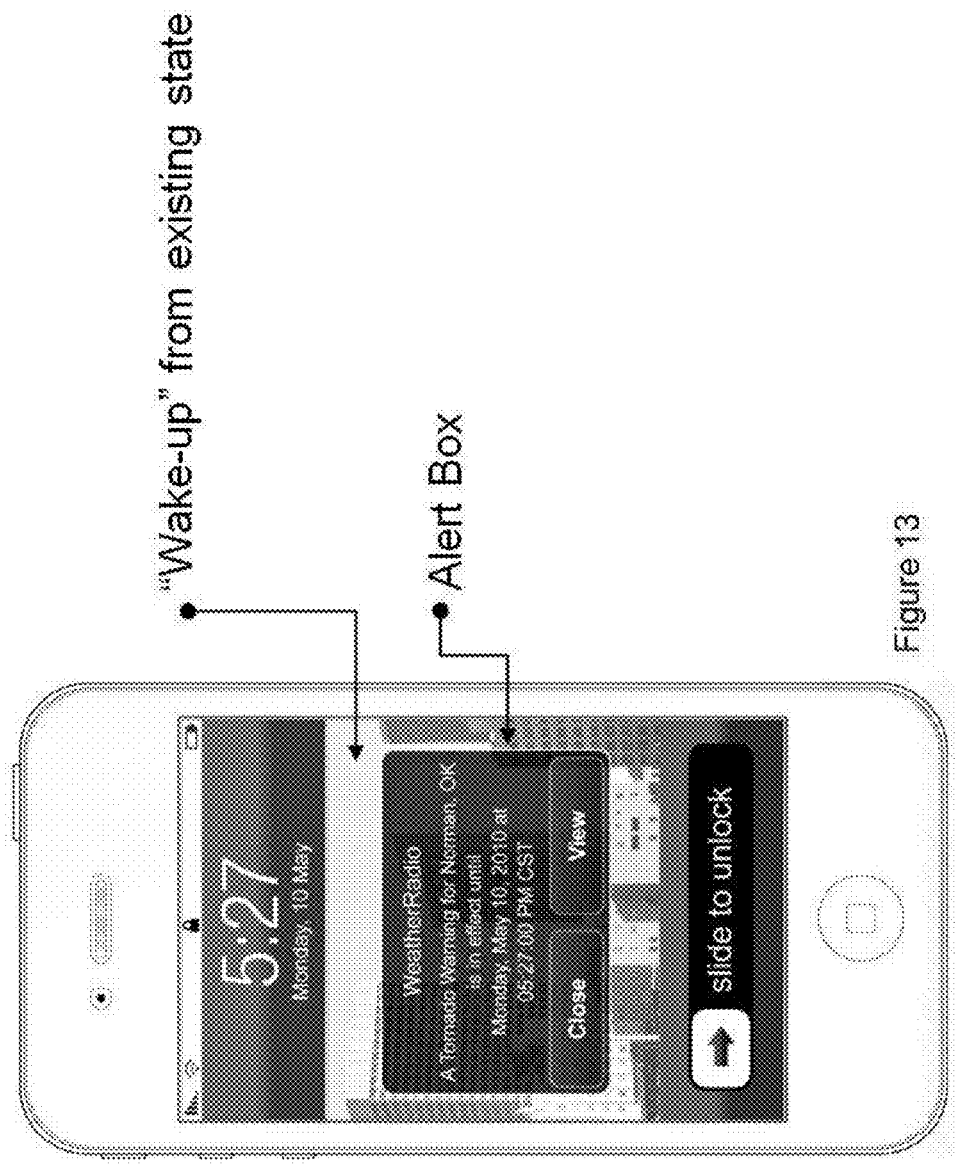

Referring now to FIG. 13, a screen shot of a mobile phone waking-up from an existing state of the phone can be seen. The existing state of the phone may be operation of another application of the phone. When on, the mobile phone wakes up when a severe weather alert is received by the phone, such as via Push Notification in the case of an iPhone. The audio portion of the alert is provided first. Upon the phone waking up for the alert, a number of auditory sounds, such as three beeps, may be sounded, followed by playing of the alert summary until the user selects "view" to view the alert on the alert detail screen, where the alert related to this pop-up will be highlighted, or until the user selects to "close" the alert. Only the summary of the alert is played in this pop-up until the user selects to learn more about the alert. In this particular example, the following alert summary is read or played audibly for the user of the device:

"A Tornado Warning for Norman, Okla. is in effect until Monday, May 10, 2010 at 05:27:00 PM CST."
The main device volume may be lowered (if not silent) and the alert audio volume increased so that the alert summary will be more readily heard. The background for the alert box or panel may be semi-transparent as shown. If desired, a background color for the alert box may be chosen, such as red.

Figure 14:
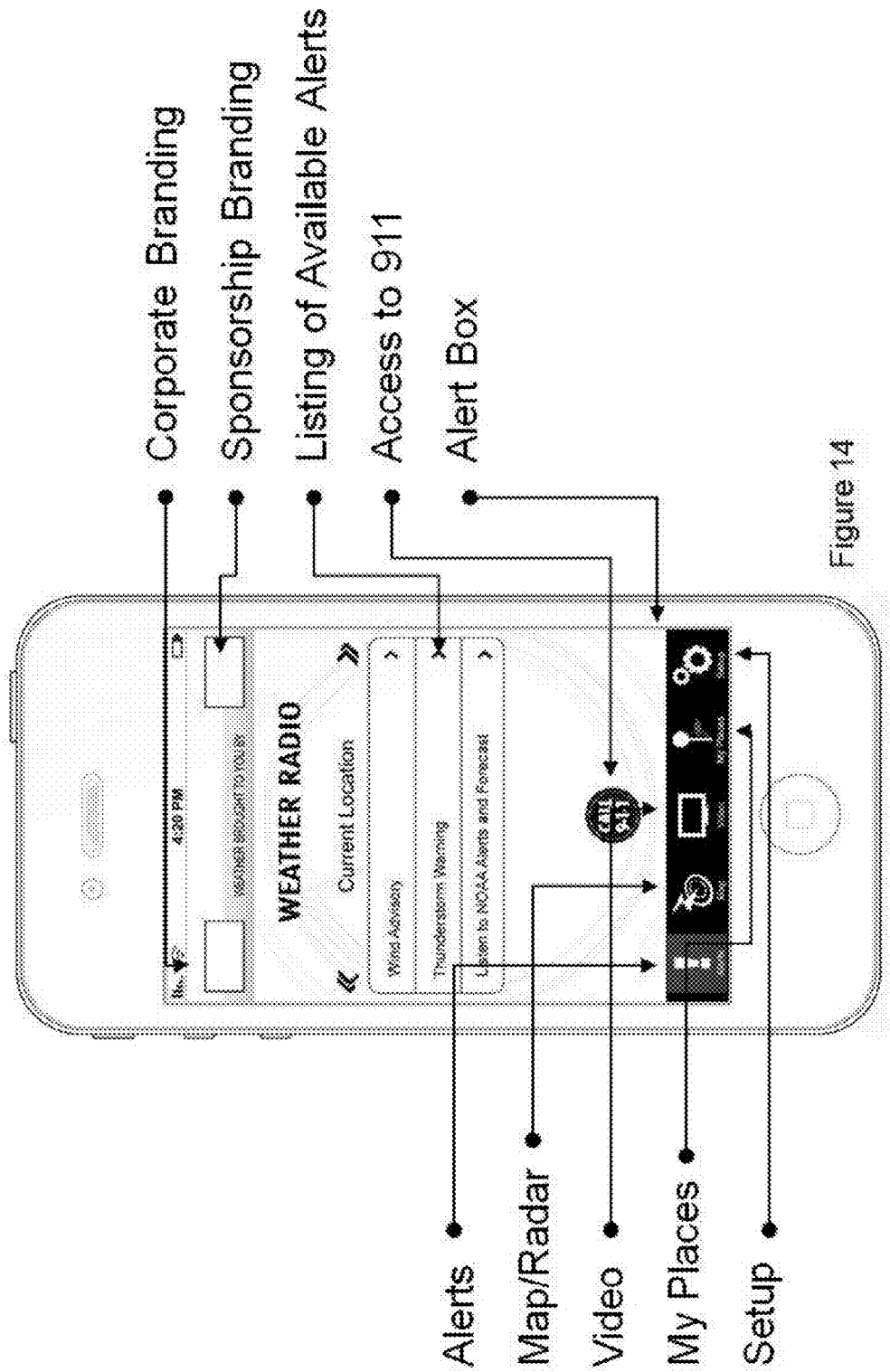

Referring now to FIG. 14, a weather alert list screen that lists alerts that are available for viewing is illustrated. A user has navigated to this screen by selecting the View button on a pop-up alert and the related alert will be highlighted in the listing of alerts. In this drawing, the alert box provides important alert information to the phone user. In the alert box, five menu control buttons are displayed along the bottom of the alert box, from left to right: an Alert Button, a Map/Radar button, a Media (video) button, a My Places button, and a Setup button. The Alert Button when selected allows a viewer to see a listing of available alerts for the current location, as shown in this drawing. The Map/Radar button can be selected to show radar and map information for an alert area. The Video button can be selected to see/hear live streaming video and/or audio about a selected alert if available. The My Places button at the bottom of the alert box allows a user to select and control locations of interest. The Setup button allows the user to select settings for the alert application, such as weather settings, as will be described.

It can be seen that the Alert Button is selected and the weather alert list screen lists three alerts for the current device location: a wind advisory, a thunderstorm warning, and forecasts for the location. Any of these three alert notifications can be selected to access more detailed information. It can be seen that although the alerts are listed for the current location, the forward- and backward-arrows indicate that the user can scroll through other locations if desired. The My Places button at the bottom of the alert box allows a user to select and control locations of interest. The user can additionally scroll down the list in the alert panel to see additional alerts.

Also as part of the alert box, the user can access local emergency services by activating the 911 alert button. The user can select the 911 button to launch a standard emergency dialer with the needed 911 number pre-filled. The user would then have to only select the (green) call button to activate a call to emergency services. In some instances, the 911 button may only appear if there is an alert for the device's current location; otherwise, a "call contacts" button may be provided, as illustrated in another drawing.

Corporate branding is shown and a user may select corporate branding if they wish to visit a corporate website, by launching their browser. Sponsorship branding may also be shown.

Figure 15:
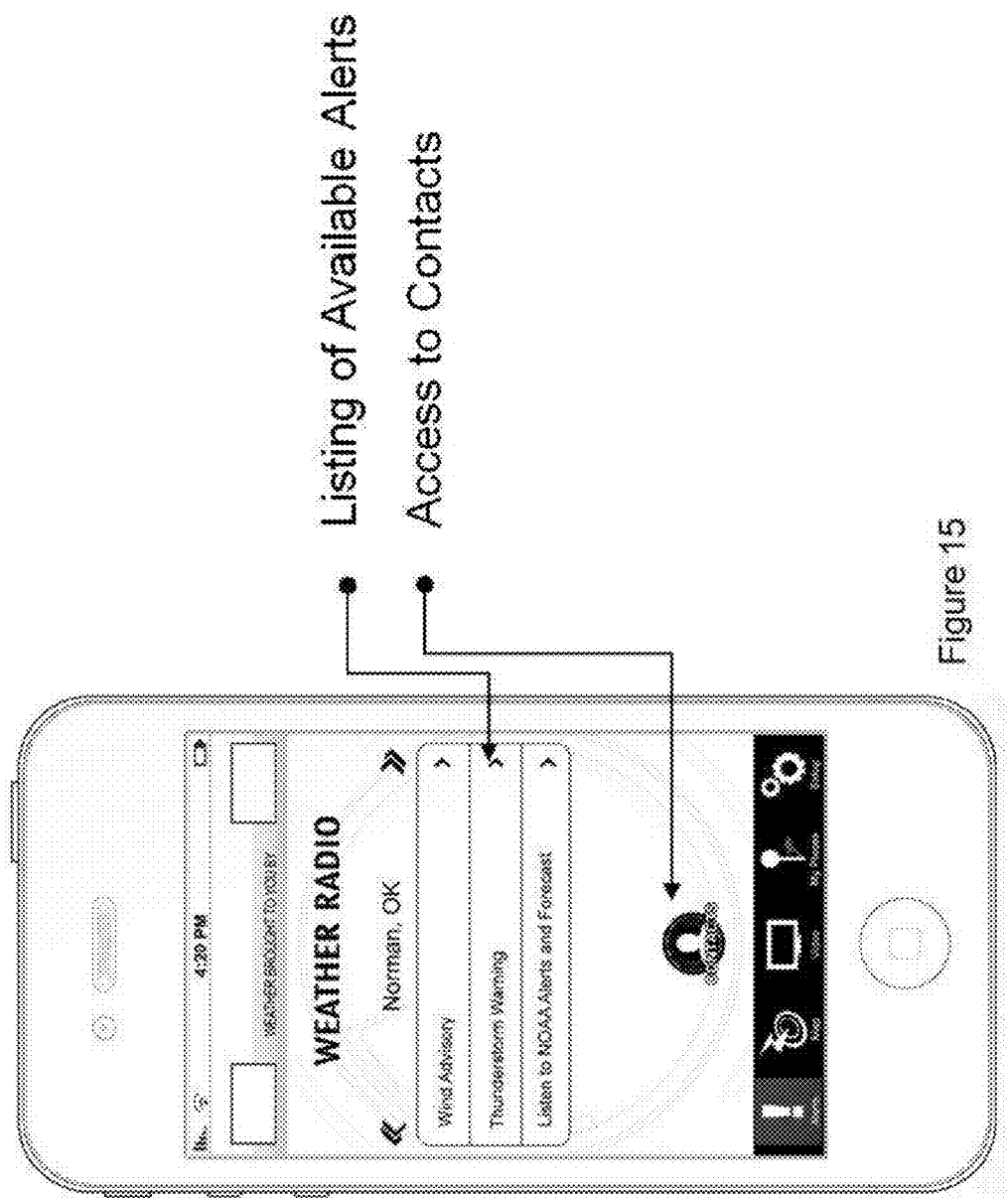

The weather alert list screen of FIG. 15 provides a listing of available weather alerts relevant to a current location in Norman, Okla. In this particular example, the available alerts of the listing are: a wind advisory, a thunderstorm warning, and an option to listen to NOAA alerts and forecasts. As illustrated, the alert box or panel may contain a button by which contact information may be accessed. It is noted that a contacts button may be placed in any screen shot of the alert application as desired.

Figure 16:
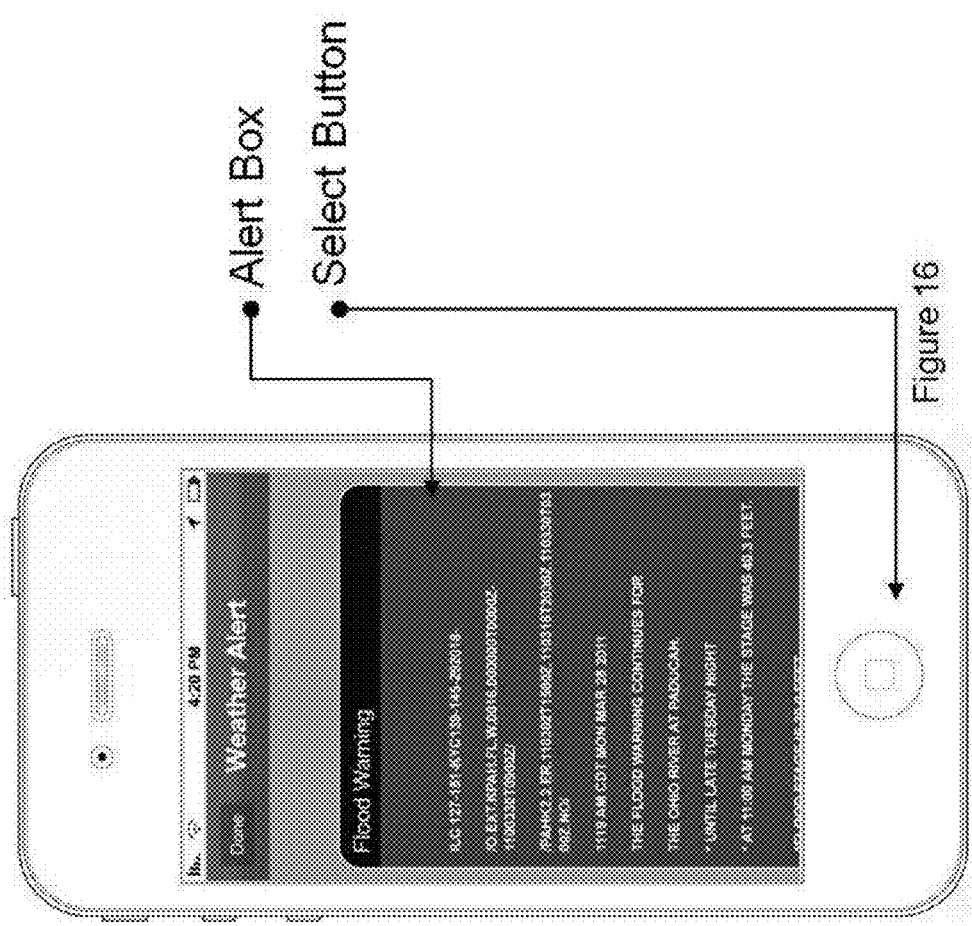

Once a user has selected to learn more about an alert listed in the alert listing of FIG. 14, a weather alert detail screen is displayed. Referring now to FIG. 16, the text detail of a flood warning is displayed in the alert box. Detailed alert information about the flood, such as time of alert, duration of alert, location of alert, severity, etc. are provided. The alert information is displayed as text in the alert panel and the user may scroll through this content as needed. The Select button may be selected to return to the alert list screen. It can be seen that the menu control buttons listed in the alert listing screen of FIG. 14 are not present, in order to maximize display area in the alert box. Also, the user may not wish to go to a different mode of the alert application from the alert detail screen so it is not necessary to provide the menu control buttons here.

Figure 17:
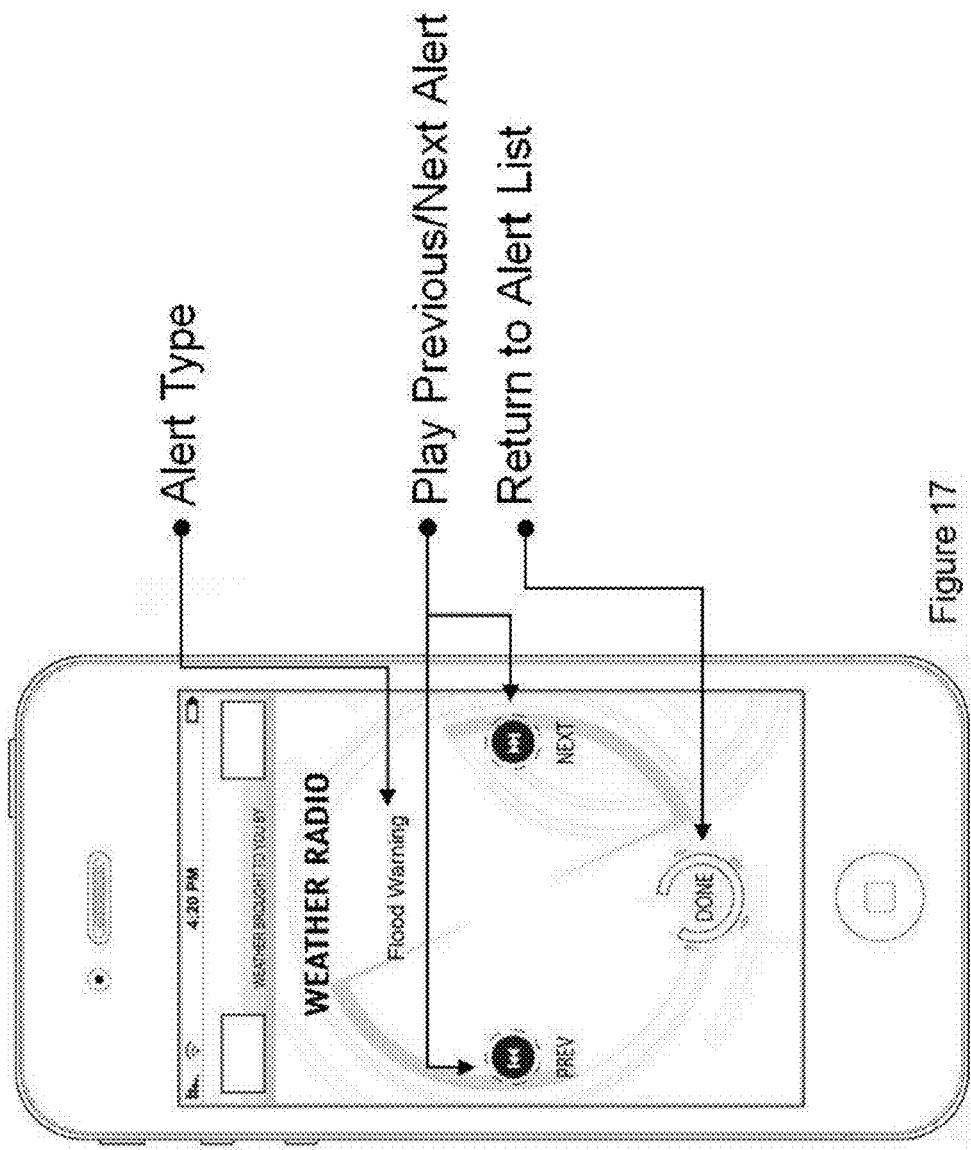

The screen shot of FIG. 17 provides an alternate way in which a user may navigate through alerts. A Flood warning is the alert type, and a user may navigate to play/view previous or next alerts by touching the backwards or forwards play button. Touching the Done button will return the user to the Alert List of a previous screen.

Figure 18:
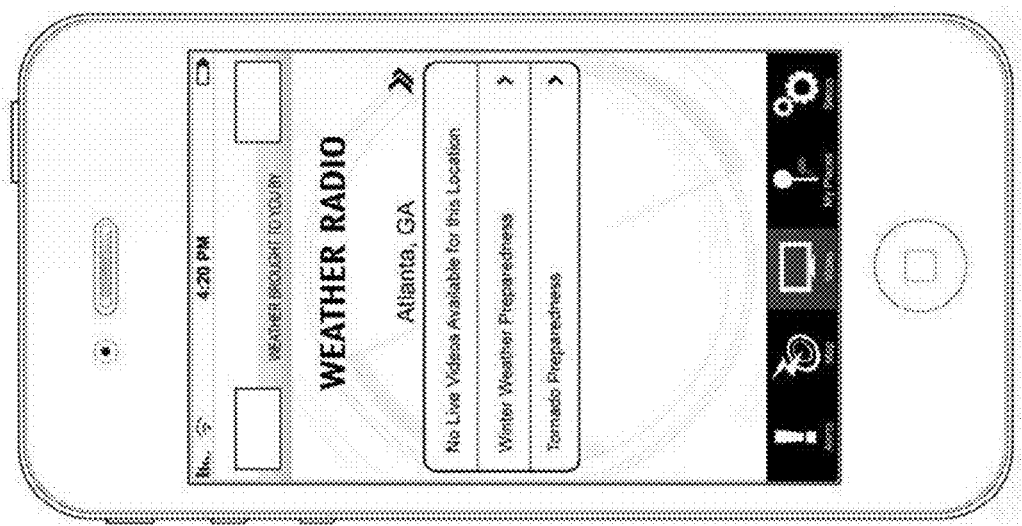

Next, as illustrated in the screen shot of FIG. 18, selection of the Video menu button of the Alert box displays for the user the available videos for a location, such as Atlanta, Ga., in this example. The available media options are listed as: no live videos available, a video on winter weather preparedness, and a video on tornado preparedness. Other types of audio/visual information may be listed and accessed if desired, such as photos, audio, streaming audio, etc.

Figure 19:
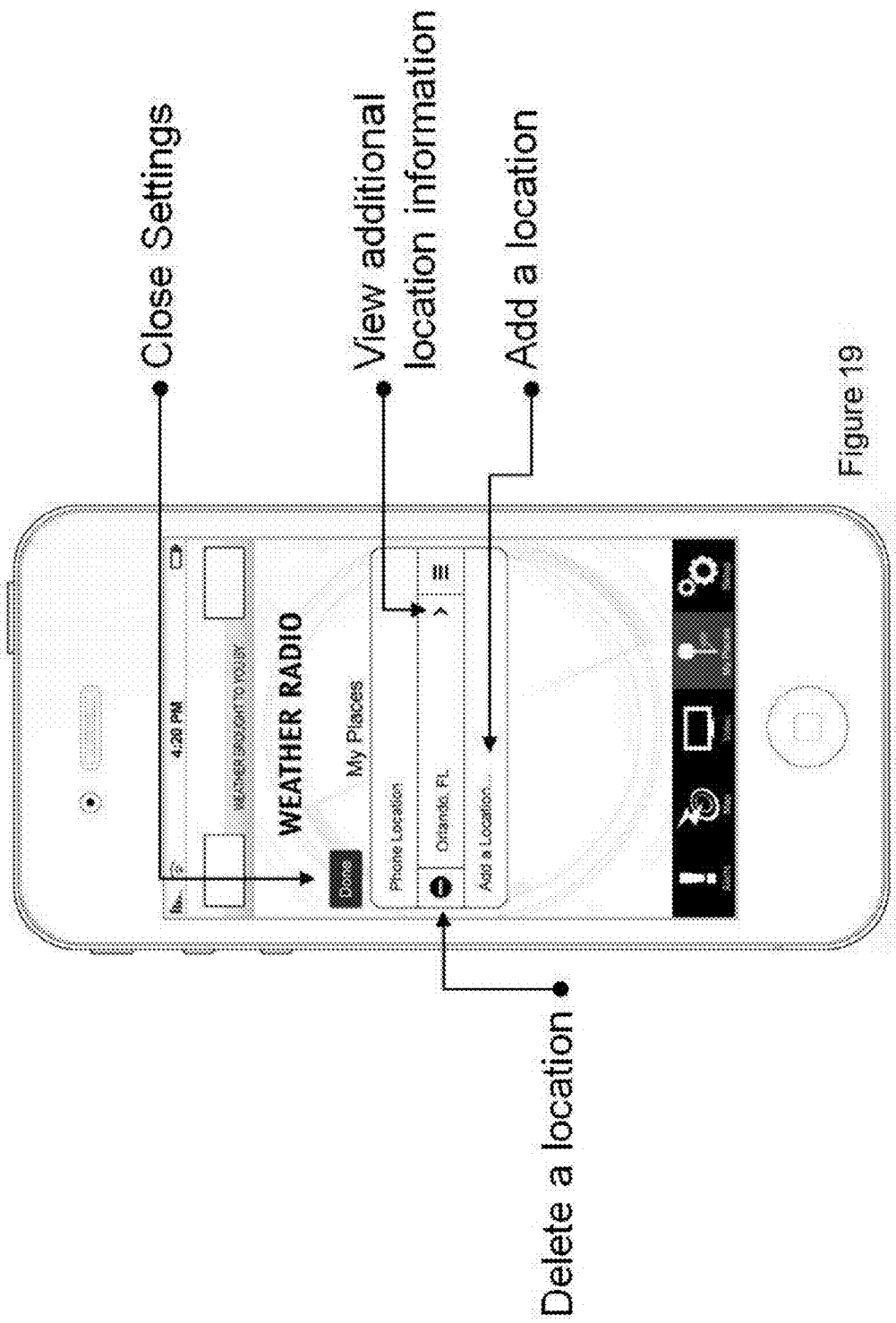
Figure 20:
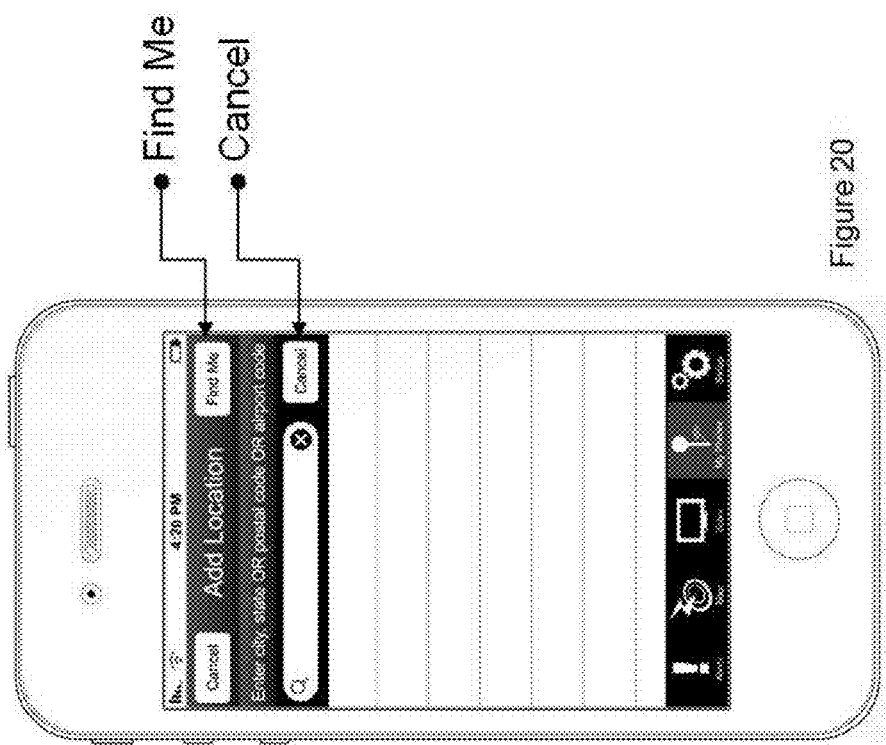
Figure 21:
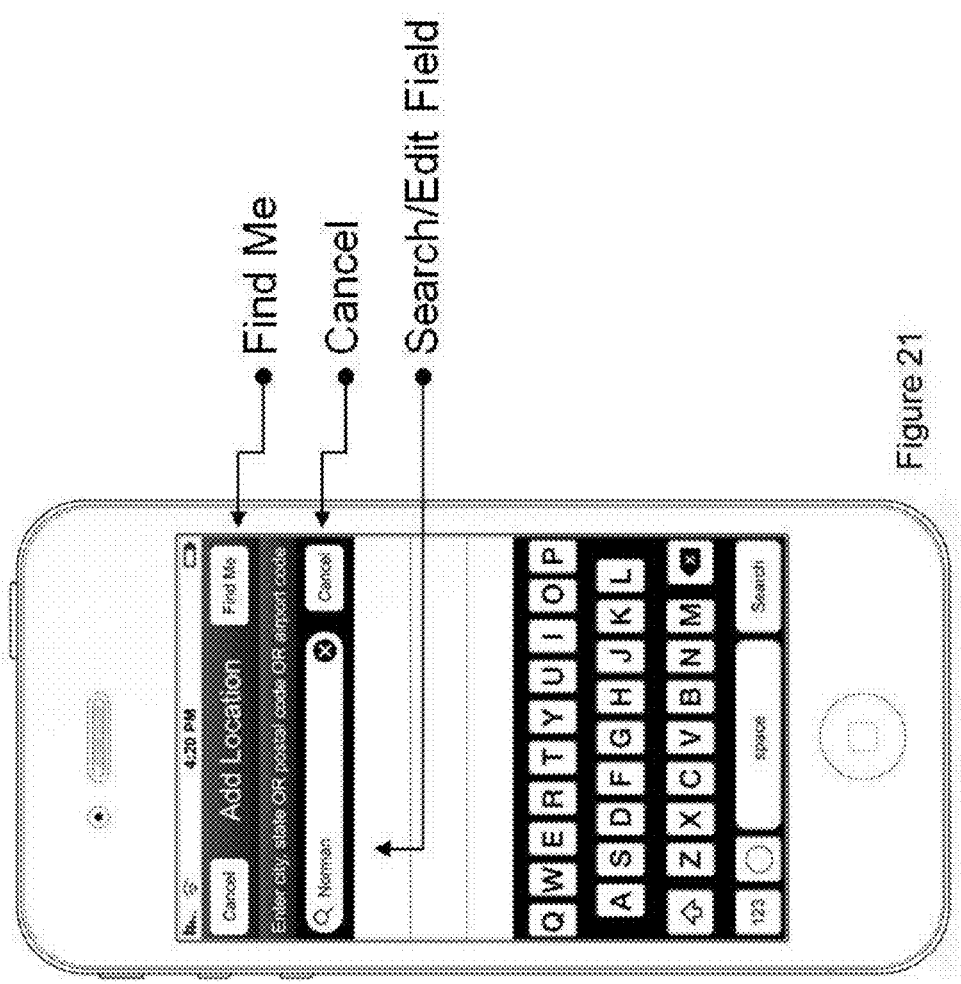

Referring now to FIG. 19, the My Places menu control button of the alert box accesses locations or places stored in the alert application of the phone and provides the opportunity to add new locations to be monitored or cancel/delete locations. In this particular example, a location of Orlando, Fla. is stored in the application. This allows a user to the alert application to receive alert information about Orlando as a stored and monitored location. This location may be deleted by activating the delete location button and additional information about the location or editing of the location may be accomplished by choosing to view additional location information about Orlando. Moreover, selection of the add a location button will bring up a screen that will allow a new location to be added to My Places. Touching the Done button will allow a user to close settings, returning to the previously viewed screen. As shown in FIG. 20, a new location may be added by entering a city and state, a postal (zip) code, an airport code, geographical location, or other point of interest (POI). FIG. 21 shows entry of a city in the search/edit field through use of the keyboard interface of the user interface in the alert box. The user types in the name of a city, postal code, airport code, geographical location, or other POI in the search edit field. In FIGS. 20 and 21, selection of the cancel button returns the user to the previously viewed screen. Also, selection of the Find Me button of the alert box enables the user to find their current location using the GPS capabilities of the mobile device.

Figure 22:
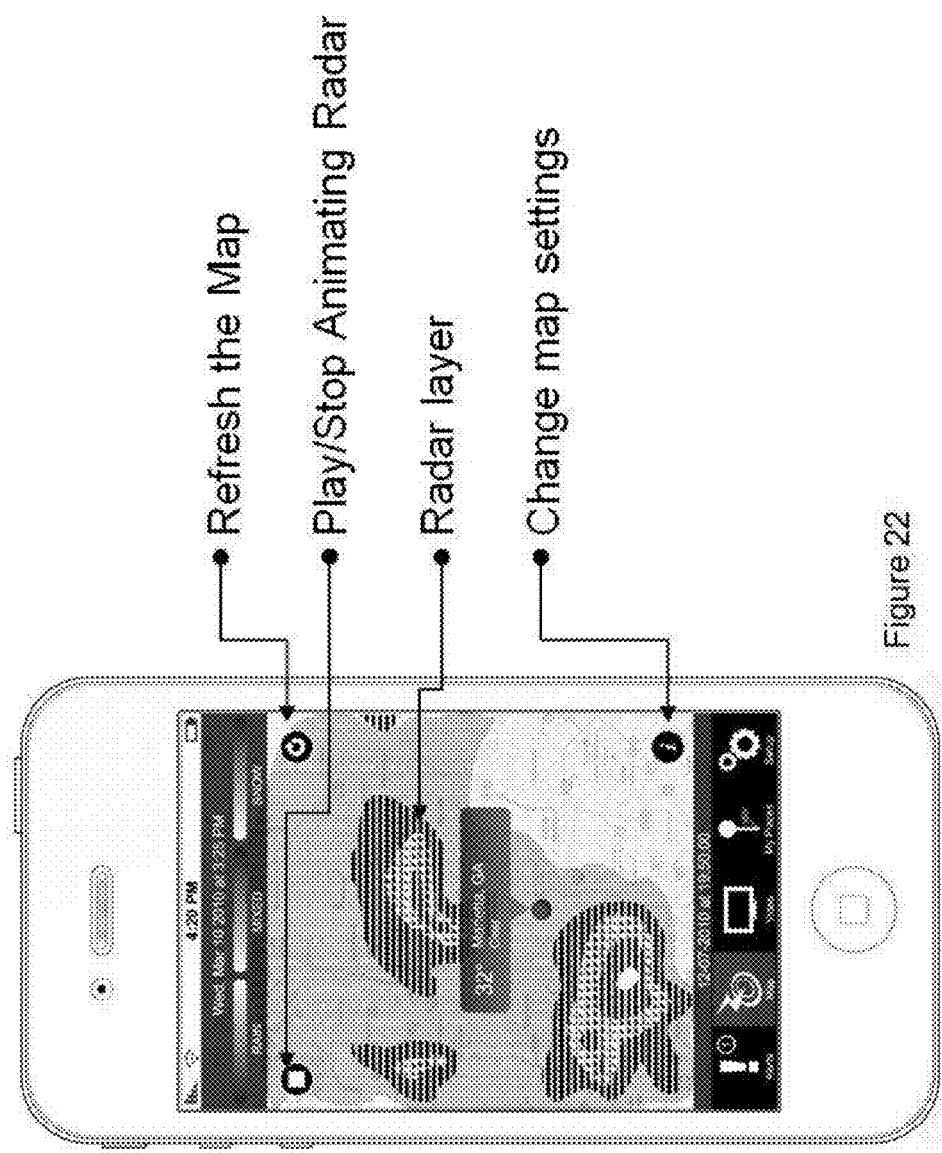
Figure 23:
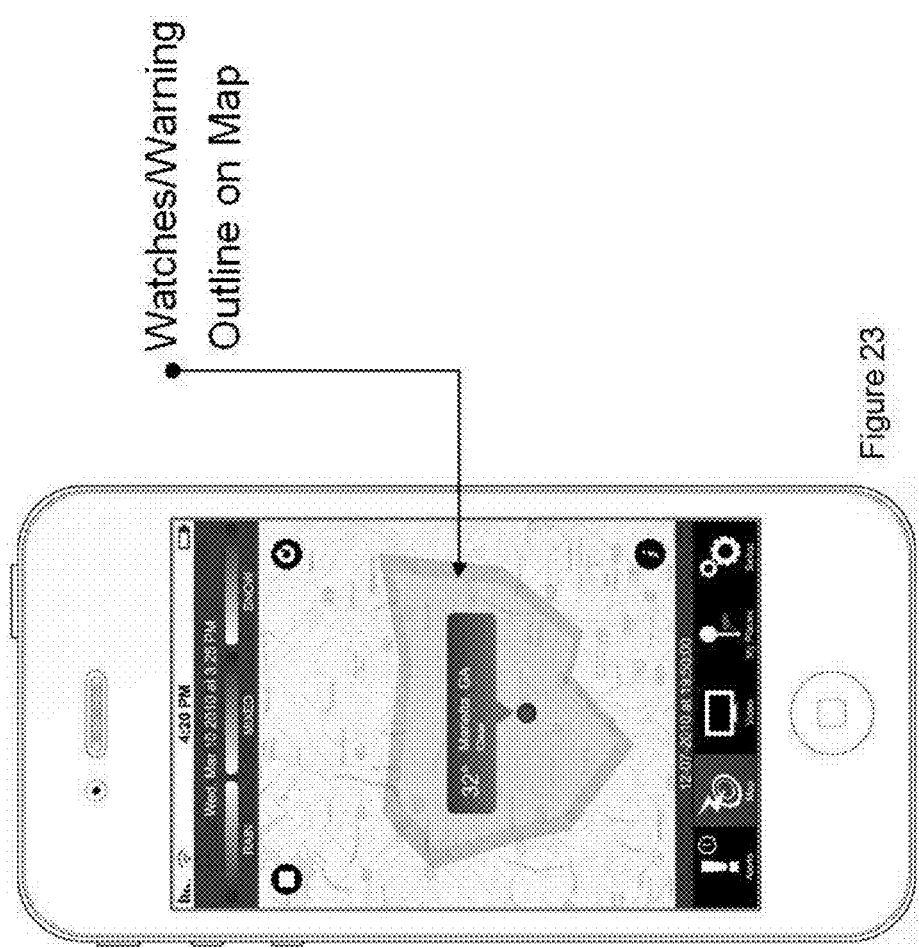

Referring now to the map panel screenshots of FIGS. 22 and 23, pressing the Map/Radar menu button of the alert box allows the user to view radar and map data about a selected alert. A user can navigate to this screen by touching the Map menu button of the alert box. As indicated in FIG. 22, there may be different regions of an alert, each corresponding to the level of severity of the warning. Thus, locations with a Watch may be shown with a yellow color or indicator, locations with a Warning may be shown with a red color or indicator, and locations with neither Watches nor Warnings may have blue color or indicator. As shown in FIG. 23, a geographical area subject to Watches/Warnings is outlined on the radar map.

A user may touch the play/stop button to play or stop animating radar in the alert box. The information "i" button may be touched to change map settings, such as to choose the layers to be shown on the radar map, etc. The refresh button may be touched to refresh the map. The user may touch the Alert button to return to the alert listing screen of the alert box.

Figure 24:
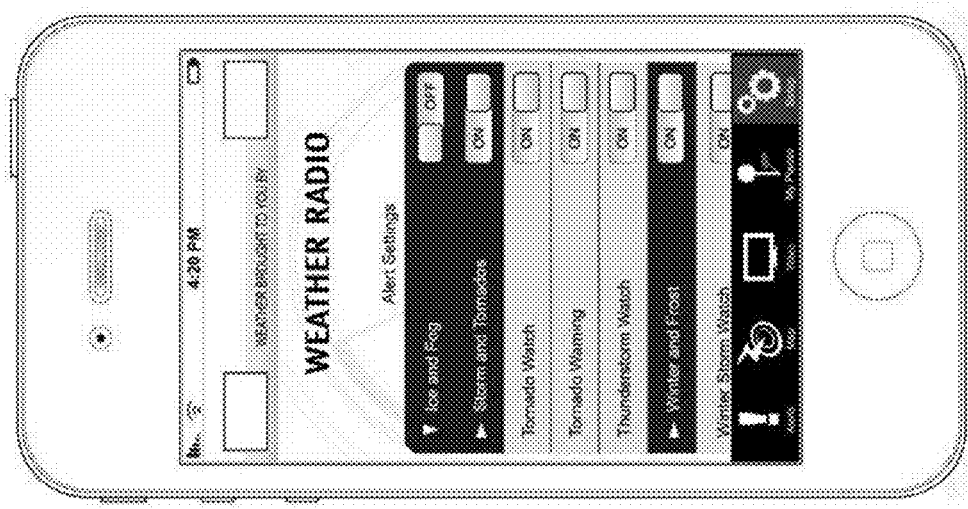

Referring now to FIG. 24, selection of the Setup menu button by the user allows the user to control certain setting of alerts, such as turning alerts on and off. There may be various alert settings of the alert application which the user may set by appropriate selection of alert settings. As shown in this example, a user may choose to turn ON or OFF the following alert settings: Ice and Fog, Storm and Tornadoes, Tornado Watch, Tornado Warning, Thunderstorm Watch, Winter and Frost, Winter Storm Watch. There may be any number of additional alert settings provided to the user by the alert application.

In accordance with various embodiments presented herein, a next generation mobile weather radio/emergency alerting system that will enable a mobile user to receive audio alerts, like the NOAA Weather Radio Network, visual alerts, geographic representation of the location of alerts, and video associated with alerts issued by organizations including the National Weather Service, FCC Emergency Alert System, and the Lightning Prediction Alert Service is provided.

In addition to allowing the user to receive alerts, the Mobile Weather Radio, using the Tile System, will increase the accuracy of alerts that notify the user from a 40 mile radius to a 1 mile radius. This will eliminate a whole series of issues around the NOAA Weather Radios where the user could be woken up or alerted for a condition or threat affecting a location up to 80 miles away.

The weather radio also can track a set of location-enabled devices for a user. The set of devices being tracked can include a device being carried by friends (when they allow it), the user's own device, or devices tracking assets. This tracking is done using the Tile structure insuring that the same accuracy is applied if the device is in motion or stationary.

Another primary benefit gained by issuing audio alerts using mobile devices is that the application is simple to setup, mobile once setup, and more likely to be near a person using the device when an alert is issued.

Therefore, at least the following characteristics or features of the various embodiments of Multimedia Alerting described herein are believed to be novel and therefore patentably distinct in accordance with the various embodiments:

1. The ability to match the location of a device to a media provider to supply Video and Audio based on the user's location.
2. The ability to allow users to be notified on a pending "high probability" of lightning activity within a specified range from the location of the device.
3. The ability to allow users to be notified of actual lightning events in a specified range of the location of the device.
4. The ability to match non-weather alerts, such as alerts issued by FEMA, Civil Defense, Homeland Security, or other Emergency Alerting System (EAS) notifications to the devices location to select the broadcast to render to the user of the device.
5. The ability to play locally broadcasted media about a severe weather situation localized to the user's device location.
6. The ability for the mobile device to receive NOAA Severe Weather Alerts for a general area and filter those alerts on the device based on the users location.
7. The ability to plot severe weather activity crossing the path of a moving vehicle based on location and speed coupled with the severe conditions location and speed.
8. The ability to register with the server to receive severe weather alerts from other mobile devices, such as, a device carried by children, spouse, or other family members. The registration process can thus include the requirement that the owner of the requested device warning allow the person or device to receive these notifications before allowing the registration to be completed.
9. This product will give the ability for the user to "dial for help" in the event that the event is of sufficient severity. In the event that a severe weather alert is issued based on the location of the targeted device using information about the devices location, an 'dial emergency number' button or 'dial 911' for the a location within the United States of America would be presented to the user. In the event that the received alert is not created for the receiving device, then the 'dial friend' button would replace the 'dial emergency' button.
10. Based on battery status, the application will alert the user to features that will consume significant amount of power thus allowing the user to prolong battery life in critical situations. These alerts would notify the user when they:
    a. Select to view video: an audio only broadcast option would be available.
    b. The device would automatically reduce the "Update Rate" of the devices location to report location at a slower rate thus reducing the number of times a radio transmission is necessary.
11. The ability for the user to elect to specify that alerts be automatically plotted on a map giving the user a better understanding where the severe weather activity is being observed in relation to the device location, other monitored devices, or other previously stored locations.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a receiver, a transmitter, a radio, signal drivers, clock circuits, power source circuits, and user input devices. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present invention. Such alternative storage devices should be considered equivalents.

Various embodiments described herein are implemented using programmed processors executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method of providing alert information to a user of a device, comprising:
an alert service provider transmitting an alert notification of an alert to an alert processing server;
storing the alert notification in an alert database coupled to the alert processing server;
an alert notification server retrieving the alert notification from the alert database and determining one or more alert geographical tiles of interest that are affected by the alert, wherein the one or more alert geographical tiles are of a plurality of geographical tiles and each geographical tile of the plurality of geographical tiles represents a unique geographic projection of a rendered geographical area of defined size and the one or more alert geographical tiles are the defined size of the plurality of geographical tiles;
the alert notification server determining one or more location-enabled devices each having a location that falls within an alert geographical tile of the one or more alert geographical tiles;
retrieving a text portion of the alert from the alert database and processing the text portion of the alert to generate an audio version of the alert;
constructing an alert text notification of the alert having the text portion of the alert, an alert identifier of the alert, a reference identifier for the audio version of the alert, the one or more alert geographical tiles and the one or more device identifiers for each of the one or more devices and storing the alert text notification into an alert notification queue;
a gateway server retrieving the one or more device identifiers for each of the one or more devices, the alert text notification and the alert identifier of the alert from the alert notification queue and initially transmitting only the alert text notification to the one or more devices corresponding to the retrieved one or more device identifiers;
a device of the one or more devices receiving and processing the alert text notification and responsive to user direction requesting to receive alert data of the alert in addition to the alert text notification of the alert initially transmitted to and received by the device, wherein prior to the device of the one or more devices requesting to receive alert data of the alert further comprising:
obtaining a current location of the device represented by a device geographical tile, wherein the device geographical tile is the defined size of the plurality of geographical tiles; and
converting the current location of the device to a device tile code and storing the device tile code representative of the current device location to a device location database;

the device receiving and presenting to a user of the device the received alert data of the alert through a user interface of the device;
determining whether the device is authorized to receive alert notifications;
if the device is not authorized to receive alert notifications, the alert notification server sending to the device a request message requesting tracking of the device for alert notifications; and
if the request message is approved, the alert notification server updating the device location database to include the device as a registered device.

2. The method of claim 1, further comprising prior to the alert service provider transmitting an alert notification to the alert processing server:
an alert generating source transmitting the alert to the alert service provider;
the alert processing server linking a text portion of the alert to a database record of the alert, storing the text portion in a file server, and storing the alert received from the alert generating source in an alert database.

3. The method of claim 2, wherein the alert comprises one or more of a text representation of an alert event, one or more locations associated with the alert event, a start time of the alert event, a stop time of the alert event, and a severity indication of the alert event.

4. The method of claim 1, further comprising the alert processing server processing the alert and storing the alert in the alert database.

5. The method of claim 4, further comprising the alert processing server extracting alert data of the alert and storing the alert data in the alert database, wherein the alert data comprises one or more of a time of issue of the alert, a duration of the alert, a severity of the alert, an estimated time of arrival of a weather condition, and estimated time of departure of the weather condition, a direction of the weather condition, a heading of the weather condition, a title of the alert, and a base text of the alert.

6. The method of claim 5, wherein the estimated time of arrival and estimated time of departure are of a lightning weather condition.

7. The method of claim 4, wherein the alert processing server storing the alert in the alert database triggers the alert notification server to read the alert database for new alerts.

8. The method of claim 1, wherein each of the plurality of geographical tiles represents a unique Mercator rendered geographical area approximately 2 square kilometers in size.

9. The method of claim 1, wherein prior to retrieving the alert notification, notifying an alert notification server coupled to the alert database that the alert notification is stored in the alert database.

10. The method of claim 1, wherein determining the one or more alert geographical tiles of the alert comprises the alert notification server determining the one or more alert tile codes that are representative of the corresponding one or more alert geographical tiles.

11. The method of claim 1, wherein the alert notification server determines the one or more devices by retrieving from the alert database a listing of the one or more devices each having a location that falls within an alert geographical tile of the one or more alert geographical tiles.

12. The method of claim 1, wherein each device of the one or more devices having a location that falls within an alert geographical tile of the one or more alert geographical tiles is registered to receive alert notifications.

13. The method of claim 1, wherein determining one or more devices each having a location that falls within an alert geographical tile of the one or more alert geographical tiles further comprises:
comparing device tile codes representative of a plurality of devices and stored in a device location database with the one or more alert geographical tile codes to identify the one or more devices of the plurality of devices that each have a location that falls within an alert geographical tile of the one or more alert geographical tiles.

14. The method of claim 1, wherein processing the text portion of the alert to generate the audio version further comprises performing text-to-speech conversion on the text portion of the alert to generate an audio file of the alert and storing a link to the audio file of the alert in the alert database.

15. The method of claim 1, wherein processing the alert to generate an audio version further comprises: formatting the text of the alert, processing a text-to-speech conversion of the alert text to generate an audio file of the alert, and storing a link to the audio file of the alert in the alert database.

16. The method of claim 1, wherein requesting to receive alert data of the alert is in response to user input received at the user interface of the device.

17. The method of claim 16, further comprising:
prompting the user of the device with an abbreviated description of the alert and an inquiry as to whether the user wishes to view the alert via the user interface of the device; and
in response to a positive response from the user via the user interface to view the alert, playing for the user via the user interface the audio version of the alert and displaying for the user an alert box of the user interface with an alert viewing option to view the alert and a close alert option to close the alert box.

18. The method of claim 1, wherein storing the device tile code to the device location database further comprises:
the device sending a registration request to the alert notification server; and
the alert notification server storing the registration request, the device identifier of the device, and the device tile code representative of the current device location in the device location database.

19. The method of claim 1, further comprising the device requesting to receive alert data of the alert from a web-based service and downloading the alert data from the web-based service.

20. The method of claim 1, further comprising the device requesting and receiving the audio version of the alert.

21. The method of claim 1, wherein in response to a request from the user of the device using the user interface of the device, further comprising requesting to receive media data related to the alert associated with a geographical tile location of the device from a third-party media provider.

22. The method of claim 21, wherein in response to the request from the user, a software application registered to receive alerts for the device requesting to receive media data from the third-party media provider.

23. The method of claim 22, further comprising the software application downloading metadata associated with the third-party media provider from a media server and rendering the metadata to the user for selection via the user interface of the device.

24. The method of claim 21, further comprising:
the device downloading a list of available media associated with the geographical tile location of the device for the alert from a media server; and upon selection by the user using the user interface of one or more media from the list of available media, downloading the one or more media to the device from the media server.

25. The method of claim 21, wherein the third-party media provider is one or more of a video broadcaster and an audio broadcaster.

26. The method of claim 1, wherein the device processing the alert text notification comprises the device notifying a software application registered to receive alerts for the device.

27. The method of claim 26, further comprising the software application processing the alert text notification and requesting to receive alert data of the alert from a web-based service, the device receiving alert data of the alert, and the software application controlling the user interface of the device presenting to the user of the device the received alert data through the user interface of the device.

28. The method of claim 27, further comprising the software application requesting to receive alert data of the alert from a web-based service and downloading the alert data from the web-based service.

29. The method of claim 27, further comprising the device receiving the audio version of the alert and the application software controlling the device to play the audio version of the alert via the user interface of the device.

30. The method of claim 1, wherein prior to requesting to receive alert data of the alert further comprising:
the device determining a current location of the device;
verifying that the current location of the device is within the one or more alert geographical tiles of interest affected by the alert;
notifying the user of the device of the alert and that the current location of the device is within an alert geographical tile of the one or more alert geographical tiles of interest affected by the alert; and
requesting to receive alert data of the alert when requested by the user of the device.

31. The method of claim 1, further comprising the device requesting and receiving the audio version of the alert and playing the audio version of the alert via the user interface of the device.

32. The method of claim 31, further comprising the device retrieving a media file associated with the alert from a text-to-speech cache server and rendering the audio of the media file to the user of the device using a text-to-speech engine coupled to the text-to-speech cache server.

33. The method of claim 1, wherein the received alert data presented to the user through the user interface of the device comprises one or more of alert text of the alert, alert audio of the alert, and a geographical map representation of the alert.

34. The method of claim 1, further comprising:
the device storing received alert data of the alert in a device database of the device.

35. The method of claim 1, wherein each geographical tile of the plurality of geographical tiles is a four sided polygon.

36. The method of claim 1, wherein the device geographical tile is a four sided polygon.

37. A method of providing alert information to a user of a device, comprising:
an alert service provider transmitting an alert notification of an alert to an alert processing server;
storing the alert notification in an alert database coupled to the alert processing server;
an alert notification server retrieving the alert notification from the alert database and determining one or more alert geographical tiles of interest that are affected by the alert of a plurality of geographical tiles, wherein each geographical tile of the plurality of geographical tiles represents a unique geographic projection of a rendered geographical area of defined size;
the alert notification server determining one or more location-enabled devices each having a location that falls within an alert geographical tile of the one or more alert geographical tiles;
retrieving a text portion of the alert from the alert database and processing the text portion of the alert to generate an audio version of the alert;
constructing an alert text notification of the alert having the text portion of the alert, an alert identifier of the alert, a reference identifier for the audio version of the alert, the one or more alert geographical tiles and the one or more device identifiers for each of the one or more devices and storing the alert text notification into an alert notification queue;
a gateway server retrieving the one or more device identifiers for each of the one or more devices, the alert text notification and the alert identifier of the alert from the alert notification queue and transmitting the alert text notification to the one or more devices corresponding to the retrieved one or more device identifiers;
a device of the one or more devices receiving and processing the alert text notification and requesting to receive alert data of the alert, wherein prior to the device of the one or more devices requesting to receive alert data of the alert further comprising:
obtaining a current location of the device represented by a device geographical tile; and
converting the current location of the device to a device tile code and storing the device tile code representative of the current device location to a device location database;
the device receiving and presenting to a user of the device the received alert data of the alert through a user interface of the device;
determining whether the device is authorized to receive alert notifications;
if the device is not authorized to receive alert notifications, the alert notification server sending to the device a request message requesting tracking of the device for alert notifications; and
if the request message is approved, the alert notification server updating the device location database to include the device as a registered device.

38. The method of claim 37, further comprising the user of the device accepting to receive alerts on the device and the device sending to the alert notification server a grant request to update the device location database.

39. A method of providing alert information to a user of a device, comprising:
in response to an alert notification of an alert, determining one or more alert geographical tiles of interest that are affected by the alert, wherein the one or more alert geographical tiles are of a plurality of geographical tiles and each geographical tile of the plurality of geographical tiles represents a unique geographic projection of a rendered geographical area of defined size and the one or more alert geographical tiles are the defined size of the plurality of geographical tiles;
determining one or more location-enabled devices each having a location that falls within an alert geographical tile of the one or more alert geographical tiles;
retrieving a portion of the alert from an alert database and processing the portion of the alert to generate a media version of the alert;

constructing an alert text notification of the alert having the text portion of the alert, an alert identifier of the alert, a reference identifier for the media version of the alert, the one or more alert geographical tiles, and one or more device identifiers for each of the one or more devices;

retrieving the one or more device identifiers for each of the one or more devices, the alert text notification and the alert identifier of the alert and initially transmitting only the alert text notification to the one or more devices corresponding to the retrieved one or more device identifiers prior to a device of the one or more devices receiving and processing the alert text notification and requesting to receive alert data of the alert further comprising:

obtaining a current location of the device represented by a device geographical tile; and converting the current location of the device to a device tile code and storing the device tile code representative of the current device location to a device location database;

receiving and presenting to a user of the device the received alert data of the alert through a user interface of the device;

determining whether the device is authorized to receive alert notifications;

if the device is not authorized to receive alert notifications, sending to the device a request message requesting tracking of the device for alert notifications; and if the request message is approved, updating the device location database to include the device as a registered device.

40. The method of claim 39, further comprising:

the device of the one or more devices receiving and processing the alert text notification and responsive to user direction requesting to receive alert data of the alert in addition to the alert text notification transmitted to and received by the device; and the device receiving and presenting to the user of the device the received alert data of the alert through the user interface of the device.

41. The method of claim 39, wherein the media version of the alert comprises an audio version of the alert and wherein retrieving a portion of the alert from an alert database and processing the portion to generate the media version of the alert further comprises:

retrieving a text portion of the alert from the alert database; and processing the text portion of the alert to generate the audio version of the alert.

42. The method of claim 39, wherein each geographical tile of the plurality of geographical tiles is a four sided polygon.

* * * * *